United States Patent
Ohbayashi et al.

(10) Patent No.: US 7,057,788 B2
(45) Date of Patent: Jun. 6, 2006

(54) SPATIAL LIGHT MODULATOR AND LIGHT PULSE WAVEFORM CONTROLLER

(75) Inventors: Yasushi Ohbayashi, Hamamatsu (JP); Narihiro Yoshida, Hamamatsu (JP); Hideo Suzuki, Hamamatsu (JP); Tsutomu Hara, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 219 days.

(21) Appl. No.: 10/415,184

(22) PCT Filed: Oct. 30, 2001

(86) PCT No.: PCT/JP01/09506

§ 371 (c)(1),
(2), (4) Date: Apr. 25, 2003

(87) PCT Pub. No.: WO02/37174

PCT Pub. Date: May 10, 2002

(65) Prior Publication Data

US 2004/0012835 A1  Jan. 22, 2004

(30) Foreign Application Priority Data

Oct. 31, 2000  (JP) .................................... 2000-333034

(51) Int. Cl.
*G02B 26/00* (2006.01)
*G02F 1/03* (2006.01)
*G02F 1/01* (2006.01)
*G02F 1/1335* (2006.01)

(52) U.S. Cl. ............... 359/260; 359/237; 359/263; 359/279; 349/114; 349/113

(58) Field of Classification Search ............... 359/260, 359/237, 263, 279, 294, 262, 264, 244, 584–589; 349/113–114, 105, 137
See application file for complete search history.

(56) References Cited

U.S. PATENT DOCUMENTS

| 5,682,262 A | 10/1997 | Wefers et al. ............... 359/305 |
| 5,734,503 A | 3/1998 | Szipöcs et al. ............. 359/584 |
| 5,841,489 A | 11/1998 | Yoshida et al. |
| 5,994,687 A | 11/1999 | Chanteloup et al. ...... 250/201.9 |
| 6,348,990 B1 * | 2/2002 | Igasaki et al. .............. 359/259 |

FOREIGN PATENT DOCUMENTS

| JP | A 2-23302 | 1/1990 |
| JP | A 6-51340 | 2/1994 |
| JP | A 2000-138407 | 5/2000 |
| JP | A 2000-221555 | 8/2000 |

OTHER PUBLICATIONS

Naohisa Mukohzaka et al; "Microchannel Spatial Light Modulator Using Liquid Crystal for Modulating Material"; Japanese Journal of Applied Physics; vol. 29, No. 7; Jul. 1990; pp L 1227–L 1230.

(Continued)

*Primary Examiner*—Hung Xuan Dang
*Assistant Examiner*—Joseph Martinez
(74) *Attorney, Agent, or Firm*—Oliff & Berridge, PLC

(57) ABSTRACT

A chirp compensation dielectric multilayer film mirror (10) reflects an incident light in a predetermined wavelength range and has group delay characteristics that prevent at least one of the dielectric multilayer film mirror (10) and a light transmission portion from applying a phase disturbance to an incident light within the predetermined wavelength range. Therefore, all the wavelength components of the incident light in the predetermined wavelength range are reflected by the chirp compensation dielectric multilayer-film mirror (10), and no additional undesired phase disturbance occurs by the dielectric multilayer film mirror (10) and the light transmission portion. Accordingly, a spatial light modulator (1) enables a desired modulation only by a liquid crystal layer without giving an additional undesired phase disturbance to an output light.

24 Claims, 14 Drawing Sheets

OTHER PUBLICATIONS

Tempea, Gabriel et al., "Dispersion Control Over 150 THz with Chirped Dielectric Mirrors," IEEE Journal of Selected Topics in Quantum Electronics, vol. 4, No. 2, Mar./Apr. 1998, pp. 193–196.

Dorrer, C. et al., "Programmable phase control of femtosecond pulses by use of a nonpixelated spatial light modulator," Optics Letters, May 1, 1998, vol. 23, No. 9, pp. 709–711.

Yamashita, Mikio et al., "Application of Spatial Light Modulation for Generation of Monocycle Optical Pulses," Laser Review, Aug. 2000, vol. 28, No. 8, pp. 492–499.

Itoh, Haruyasu et al., "Reflect–Type, Highpower–Laser Pulse Shaping System and its Operation Verified by Frequency Resolved Optical Gating," Laser Original, Aug. 2000, vol. 28, No. 8, pp. 511–515.

* cited by examiner

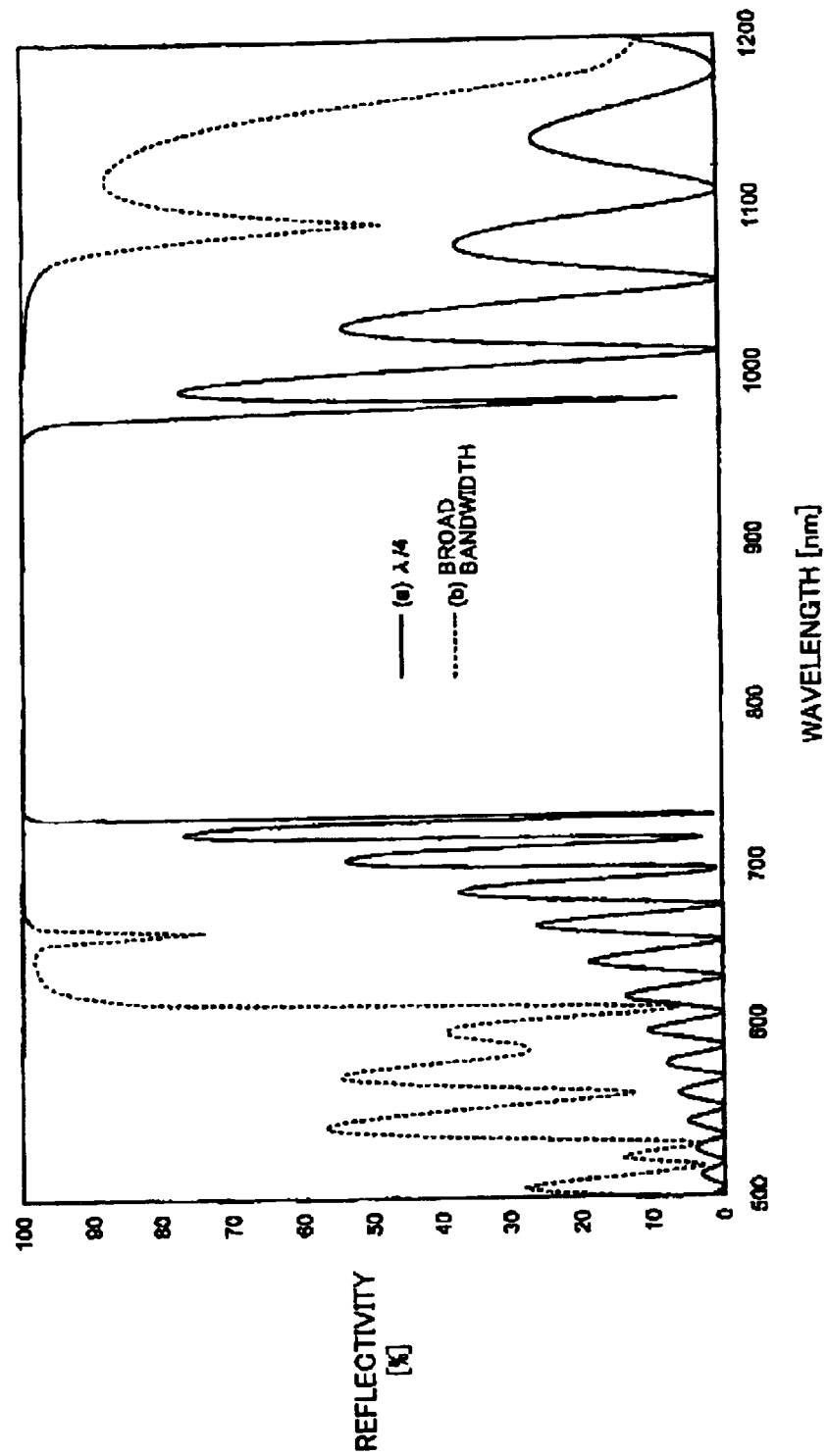

FIG.5

<THICKNESSED OF LAYERS IN CHIRP
COMPENSATION MULTILAYER FILE MIRROR>

| LAYER NUMBER | FILM MATERIAL | REFRACTIVE INDEX | OPTICAL FILM THICKNESS [nm] |
|---|---|---|---|
|  | (ORIENTATION LAYER) | [1.6] | *** |
| 39 | TiO2 | 2.25 | 106.0254 |
| 38 | SiO2 | 1.45 | 151.1246 |
| 37 | TiO2 | 2.25 | 84.7224 |
| 36 | SiO2 | 1.45 | 140.8197 |
| 35 | TiO2 | 2.25 | 236.8572 |
| 34 | SiO2 | 1.45 | 164.8388 |
| 33 | TiO2 | 2.25 | 66.336 |
| 32 | SiO2 | 1.45 | 123.2353 |
| 31 | TiO2 | 2.25 | 243.3494 |
| 30 | SiO2 | 1.45 | 212.07 |
| 29 | TiO2 | 2.25 | 205.5106 |
| 28 | SiO2 | 1.45 | 206.9608 |
| 27 | TiO2 | 2.25 | 205.1169 |
| 26 | SiO2 | 1.45 | 205.6843 |
| 25 | TiO2 | 2.25 | 205.0496 |
| 24 | SiO2 | 1.45 | 205.2706 |
| 23 | TiO2 | 2.25 | 204.2526 |
| 22 | SiO2 | 1.45 | 205.7699 |
| 21 | TiO2 | 2.25 | 203.8781 |
| 20 | SiO2 | 1.45 | 205.2417 |
| 19 | TiO2 | 2.25 | 204.0701 |
| 18 | SiO2 | 1.45 | 204.4446 |
| 17 | TiO2 | 2.25 | 203.2825 |
| 16 | SiO2 | 1.45 | 198.1638 |
| 15 | TiO2 | 2.25 | 424.6298 |
| 14 | SiO2 | 1.45 | 199.2683 |
| 13 | TiO2 | 2.25 | 200.8049 |
| 12 | SiO2 | 1.45 | 199.249 |
| 11 | TiO2 | 2.25 | 198.3913 |
| 10 | SiO2 | 1.45 | 462.5934 |
| 9 | TiO2 | 2.25 | 177.8999 |
| 8 | SiO2 | 1.45 | 188.2527 |
| 7 | TiO2 | 2.25 | 189.0594 |
| 6 | SiO2 | 1.45 | 142.7214 |
| 5 | TiO2 | 2.25 | 133.761 |
| 4 | SiO2 | 1.45 | 522.0886 |
| 3 | TiO2 | 2.25 | 198.2406 |
| 2 | SiO2 | 1.45 | 174.1928 |
| 1 | TiO2 | 2.25 | 446.5072 |
|  | (LIGHT SHIELDING LAYER) | [1.6] | *** |

FIG.8

⟨THICKNESSED OF LAYERS IN CHIRP COMPENSATION MULTILAYER FILE MIRROR⟩

| LAYER NUMBER | FILM MATERIAL | REFRACTIVE INDEX | OPTICAL FILM THICKNESS [nm] |
|---|---|---|---|
| | (ORIENTATION LAYER) | [1.6] | *** |
| 39 | TiO2 | 2.25 | 94.06 |
| 38 | SiO2 | 1.45 | 119.28 |
| 37 | TiO2 | 2.25 | 156.86 |
| 36 | SiO2 | 1.45 | 163.06 |
| 35 | TiO2 | 2.25 | 157.63 |
| 34 | SiO2 | 1.45 | 152.08 |
| 33 | TiO2 | 2.25 | 179.63 |
| 32 | SiO2 | 1.45 | 165.13 |
| 31 | TiO2 | 2.25 | 174.36 |
| 30 | SiO2 | 1.45 | 170.71 |
| 29 | TiO2 | 2.25 | 182.73 |
| 28 | SiO2 | 1.45 | 195.92 |
| 27 | TiO2 | 2.25 | 173.44 |
| 26 | SiO2 | 1.45 | 185.8 |
| 25 | TiO2 | 2.25 | 188 |
| 24 | SiO2 | 1.45 | 185.79 |
| 23 | TiO2 | 2.25 | 158.53 |
| 22 | SiO2 | 1.45 | 230.64 |
| 21 | TiO2 | 2.25 | 252.3 |
| 20 | SiO2 | 1.45 | 190.98 |
| 19 | TiO2 | 2.25 | 196.2 |
| 18 | SiO2 | 1.45 | 208.07 |
| 17 | TiO2 | 2.25 | 217.89 |
| 16 | SiO2 | 1.45 | 105.66 |
| 15 | TiO2 | 2.25 | 244.28 |
| 14 | SiO2 | 1.45 | 273.97 |
| 13 | TiO2 | 2.25 | 247.39 |
| 12 | SiO2 | 1.45 | 227.2 |
| 11 | TiO2 | 2.25 | 233.54 |
| 10 | SiO2 | 1.45 | 244.28 |
| 9 | TiO2 | 2.25 | 249.89 |
| 8 | SiO2 | 1.45 | 247.24 |
| 7 | TiO2 | 2.25 | 243.14 |
| 6 | SiO2 | 1.45 | 249.51 |
| 5 | TiO2 | 2.25 | 259.02 |
| 4 | SiO2 | 1.45 | 266.39 |
| 3 | TiO2 | 2.25 | 266.64 |
| 2 | SiO2 | 1.45 | 273.34 |
| 1 | TiO2 | 2.25 | 288.99 |
| | (LIGHT SHIELDING LAYER) | [1.6] | *** | t=t₀ t=t₁

SPATIAL LIGHT MODULATOR AND LIGHT PULSE WAVEFORM CONTROLLER

TECHNICAL FIELD

The present invention relates to a spatial light modulator.

BACKGROUND ART

A spatial light modulator is known as a device for actively controlling a phase and the like of light.

A spatial light modulator of an optical address type is disclosed in U.S. Pat. No. 5,841,489 and Japanese Unexamined Patent Application Publication No.6-51340, for example. This spatial light modulator has: an address portion, a read portion, and a reflecting mirror provided between the address portion and the read portion. The address portion has a photoconductive layer. The read portion has: an optical modulation portion having a liquid crystal cell, and a light transmission portion for transmitting read light therethrough. The light transmission portion has a glass substrate and the like for transmitting the read light therethrough. The reflecting mirror is constituted by a dielectric multilayer film in which $SiO_2$ and $TiO_2$ are alternately deposited one on another. The voltage applied through the liquid crystal cell is changed in accordance with address light falling incident on the photoconductive layer. As a result, molecular arrangement of the liquid crystal changes and the refractive index of the liquid crystal also changes. When the read light passes through the liquid crystal cell, the phase of the read light is modulated.

This spatial light modulator is of a reflection type. Many spatial light modulators of a transmission type employ a metal mesh as an electrode. In the spatial light modulator of a transmission type, a portion on which a shadow of the metal mesh is cast can not be used, and therefore the whole screen can not be effectively used. On the other hand, the spatial light modulator of a reflection type does not have such a problem, and the whole screen can be effectively used.

Conventionally, the spatial light modulator of a reflection type has normally been used to control the phase of a laser beam of a single wavelength. However, it has been proposed by Itoh et al. in "Reflect-Type, Highpower-Laser Pulse Shaping System and its Operation Verified by Frequency Resolved Optical Gating", Laser Research, Vol. 28, No. 8, pp. 511 to 515, August 2000 that the spatial light modulator of a reflection type is used to control the phase of an ultrashort light pulse having a wide spectrum to shape the waveform of the ultrashort light pulse.

DISCLOSURE OF THE INVENTION

FIG. 1(a), FIG. 1(b) and FIG. 1(c) show how the phase modulation degrees, attained by the spatial light modulator disclosed in the U.S. Pat. No. 5,841,489 and Japanese Unexamined Patent Application Publication No.6-51340 onto read lights with wavelengths of 530 nm, 633 nm and 800 nm, change in accordance with the intensity of the address light intensity applied thereto. It is apparent from these figures that as the address light intensity changes from 0.1 µW/cm² to 1000 µW/cm², the phase modulation of 0 to 2π (that correspond to a single wavelength) can be attained at each wavelength. It is known that the amount of the phase modulation can be actively controlled for each wavelength of the read light by causing the read light to pass through the liquid crystal cell and by changing the intensity of the address light falling incident on the photoconductive layer.

It is conceivable to employ, as the reflecting mirror within the spatial light modulator, a dielectric multilayer-film in which a dielectric material having an arbitrary high refractive index and another dielectric material having an arbitrary low refractive index are provided one on another in alternation. In order to attain high reflectivity, the dielectric multilayer-film can be produced in the form of a λ/4 alternate multilayer-film, for example. The λ/4 alternate multilayer-film is such a multilayer-film in which the optical film thickness (the product of refractive index and a film thickness) of each layer is set to a quarter of the wavelength λ of the read light.

However, such a λ/4 alternate multilayer-film has high reflectivity only in a predetermined narrow wavelength range as indicated by a solid line (curve "a") in FIG. 2. For this reason, the λ/4 alternate multilayer-film is not suitable for reflecting incident light having a wide spectrum.

It is conceivable to modify the λ/4 alternate multilayer-film by appropriately adjusting the optical film thickness of each constituent dielectric layer to produce a wide-band dielectric multilayer-film mirror that has high reflectivity over a wide band as indicated by a broken line (a curve "b") in FIG. 2. In accordance with such a dielectric multilayer film, it is possible to reflect the read light having a wide spectrum.

The dielectric multilayer-film mirror reflects the incident light by utilizing an interference effect caused by thin films. Unlike the reflection by a metal film, the incident light enters the inside of the dielectric multilayer-film mirror and is reflected thereat. For this reason, while the incident light reflects off the dielectric multilayer-film mirror, the incident light undergoes a phase delay (group delay) whose amount differs at each wavelength, and therefore the incident light is applied with a group delay dispersion. Accordingly, the mirror will apply the non-uniform amount of group delay to respective wavelengths of the incident light if the thickness of each layer in the mirror is set considering the reflection characteristics of the resultant mirror only but not considering the group delay characteristics of the resultant mirror.

For example, the amount of group delay will become non-uniform for the respective wavelengths as shown in FIG. 3 if the film thickness of each layer in the dielectric multilayer-film mirror is adjusted considering only the reflection characteristics of the resultant mirror in order to attain the reflection characteristics indicated by the graph "b" of FIG. 2. When the read light having a wide wavelength range is reflected by such a dielectric multilayer-film mirror, the read light will be applied with a dispersion of the group delay, that is, the delay of a phase whose amount differs for each wavelength. As a result, the read light is applied with an undesired phase disturbance by the dielectric multilayer-film mirror in addition to the desired amount of phase modulation shown in FIG. 1(a) to FIG. 1(c) by the liquid crystal cell. Consequently, it is impossible to attain the desired phase control onto the read light having a wide spectrum.

The read light may possibly be applied with another group delay whose amount is different for each wavelength (that is, wavelength-dispersion of the group delay) also when the read light having such a wide wavelength range passes through the glass substrate and the like within the spatial light modulator. As a result, in addition to the amount of phase modulation shown in FIG. 1(a) to FIG. 1(c) by the liquid crystal cell, the read light is applied with an undesired phase disturbance by the glass substrate and the like. Accordingly, the desired phase control cannot be applied onto the read light having a wide spectrum.

The present invention is to solve the above-described problems, and it is an object of the present invention to provide a spatial light modulator which can modulate light having a desired wavelength range with high accuracy without applying the phase of the incident light with any additional undesired disturbance.

In order to attain the above-described object, the present invention provides a spatial light modulator, comprising: an address portion receiving address information; an optical modulation portion modulating incident light by using its modulation characteristics that are changed according to the address information, the incident light having a predetermined wavelength range; a light transmission portion transmitting the incident light; and a dielectric multilayer-film mirror reflecting the incident light modulated by the optical modulation portion, the dielectric multilayer-film mirror having predetermined reflectivity characteristics within the predetermined wavelength range, the dielectric multilayer-film mirror having group delay characteristics that prevent at least one of the dielectric multilayer-film mirror and the light transmission portion from applying a phase disturbance to the incident light within the predetermined wavelength range.

In this way, the dielectric multilayer-film mirror has the predetermined reflectivity characteristics over the entire wavelength range of the incident light, and has group delay characteristics that prevent at least one of the dielectric multilayer-film mirror and the light transmission portion from applying an undesired phase disturbance to the incident light. Thus, it is possible to reflect all the wavelength components in the incident light. It is ensured that the phase of the incident light will suffer from no additional undesired disturbance. It is possible to modulate the incident light with high accuracy.

It is preferable that the dielectric multilayer-film mirror includes a plurality of different kinds of dielectric films which are provided one on another in alternation, an optical thickness of each dielectric film, which is determined dependent on refractive index of and a thickness of the subject dielectric film, having a value that corresponds to the predetermined reflectivity characteristics and to the group delay characteristics.

As described above, according to the present invention, the optical film thickness of each layer in the dielectric multilayer-film mirror is designed in order not only to attain the reflectivity characteristics but also to attain the group delay characteristics. Consequently, the dielectric multilayer-film mirror can reflect all the wavelength components of the incident light. It is ensured that the phase of the incident light will suffer from no additional undesired disturbance.

For example, the dielectric multilayer-film mirror may preferably have the group delay characteristics for applying the incident light with a group delay, whose amount is substantially fixed over the predetermined wavelength range, when the dielectric multilayer-film mirror reflects the incident light.

That is, the optical film thickness of each layer in the dielectric multilayer-film is designed so that the dielectric multilayer film will apply the incident light with such a group delay whose amount is substantially fixed relative to the wavelength of the incident light. Accordingly, when the incident light is reflected at the dielectric multilayer-film mirror, the incident light will be applied with the group delay whose amount is substantially fixed irrespective of the wavelength of the incident light. As a result, it is ensured that the phase of the output light will suffer from no additional undesired disturbance.

It is assumed that the light transmission portion applies the incident light with a very small and negligible amount of group delay dispersion while the light transmission portion transmits the light therethrough. In this case, the incident light will be applied with only: the modulation by the optical modulation portion, and the uniform-amount of group delay by the dielectric multilayer-film mirror. It is ensured that the phase of the output light will suffer from no additional undesired disturbance.

In the case where the light transmission portion applies the incident light with a predetermined group delay when transmitting the incident light therethrough, it is preferable that the dielectric multilayer-film mirror has the predetermined reflectivity characteristics within the predetermined wavelength range and has the group delay characteristics that compensate for the predetermined group delay within the predetermined wavelength range.

For example, if the light transmission portion applies the incident light with a large amount of group delay dispersion when the light transmission portion transmits the incident light therethrough, it is preferable to design the optical film thickness of each layer in the dielectric multilayer film so that the dielectric multilayer film will apply the incident light with such a group delay that cancels out the group delay dispersion when the dielectric multilayer film reflects the incident light. More specifcially, it is preferable to design the optical film thickness of each layer in the multilayer structure so that the multilayer structure will have the reflection characteristics having the predetermined reflectivity for the whole wavelength range of the incident light and so that the multilayer structure will have such a group delay characteristics that cancel out the group delay caused by the light transmission portion. It is ensured that all the wavelength components of the incident light will be reflected by the dielectric multilayer-film mirror and also that the disturbance of a phase which the light transmission portion applies to the incident light when the light transmission portion transmits the incident light therethrough will be cancelled out when the dielectric multilayer-film mirror reflects off the incident light. Consequently, it is ensured that the output light will be applied with the desired modulation by the optical modulation portion only, but will not suffer from any additional undesired phase disturbance.

It is preferable that the light transmission portion includes a transparent substrate transmitting the incident light therethrough, the transparent substrate applying the predetermined group delay to the incident light when the incident light passes through the transparent substrate, the dielectric multilayer-film mirror having the group delay characteristics that compensate for the predetermined group delay within the wavelength range.

In this case, the disturbance of phase, which is applied to the incident light when the incident light passes through the transparent substrate, is cancelled out when the incident light is reflected at the dielectric multilayer-film mirror. It is ensured that the phase of the output light will be applied with no additional undesired disturbance.

It is assumed that the transparent substrate applies the incident light with a large amount of group delay dispersion when the transparent substrate transmits the incident light therethrough and that a remaining part other the transparent substrate in the light transmission portion applies a small and negligible amount of group delay dispersion when the remaining part transmits the incident light therethrough. In such a case, because the dielectric multilayer-film mirror cancels out the group delay dispersion caused by the transparent substrate, the phase of the incident light will be applied with no additional undesired disturbance.

In this way, according to the spatial light modulator of the present invention, it is possible to subject the incident light of a desired wide wavelength range to a highly-accurate group delay control without suffering from any additional undesired disturbance.

It is possible to provide a light pulse waveform controller by using the spatial light modulator of the present invention.

That is, the present invention provides a light pulse waveform controller, comprising: a first spectral-component separation unit separating an incident light pulse having a predetermined wavelength range into spectral components, thereby producing an incident light; a first condensing unit gathering the incident light which is obtained by the first spectral-component separation unit; a first address information writing unit outputting first address information indicative of phase modulation desired to be subjected onto the incident light; a phase-modulation spatial light modulator of a reflection type subjecting the incident light to a phase modulation indicated by the first address information, the phase-modulation spatial light modulator including: a first address portion receiving the first address information; a first optical modulation portion modulating incident light by using its modulation characteristics that are changed according to the first address information; a first light transmission portion transmitting the incident light; and a first dielectric multilayer-film mirror reflecting the incident light modulated by the first optical modulation portion, the first dielectric multilayer-film mirror having first predetermined reflectivity characteristics within the predetermined wavelength range, the first dielectric multilayer-film mirror having first group delay characteristics that prevent at least one of the first dielectric multilayer-film mirror and the first light transmission portion from applying a phase disturbance to the incident light within the predetermined wavelength range; a second condensing unit gathering an output light which has been outputted from the phase-modulation spatial light modulator of a reflection type; and a second spectral-component separation unit receiving the output light gathered by the second condensing unit, combining together the received output light, and outputting a resultant light as an output light pulse.

According to the light pulse waveform controller having the above-described configuration, it is possible to phase-modulate the incident light of the predetermined wavelength range, while ensuring that the phase of the output light will suffer from no additional undesired disturbance.

The light pulse waveform controller may further comprise: a second address information writing unit outputting second address information indicative of intensity modulation desired to be subjected to the incident light; and an intensity-modulation spatial light modulator of a reflection type subjecting the incident light to intensity modulation that is indicated by the second address information, and wherein the intensity-modulation spatial light modulator of a reflection type includes: a second address portion receiving the second address information; a second optical modulation portion modulating incident light from the first condensing unit by using its modulation characteristics that are changed according to the second address information; a second light transmission portion transmitting the incident light; and a second dielectric multilayer-film mirror reflecting the incident light modulated by the optical modulation portion, the second dielectric multilayer-film mirror having second predetermined reflectivity characteristics within the predetermined wavelength range, the dielectric multilayer-film mirror having second group delay characteristics that prevent at least one of the second dielectric multilayer-film mirror and the second light transmission portion from applying a phase disturbance to the incident light within the predetermined wavelength range, and wherein the first optical modulation portion in the phase-modulation spatial light modulator of a reflection type receives the incident light that has been modulated in intensity by the intensity-modulation spatial light modulator of a reflection type.

According to the light pulse waveform controller having the above-described configuration, it is possible to modulate both phase and intensity of the incident light of the predetermined wavelength range, while ensuring that the phase of the output light will not suffer from any additional undesired disturbance.

BRIEF DESCRIPTION OF THE DRAWINGS

FIG. 1($b$) is a diagram showing how a degree of phase modulation, attained by a spatial light modulator onto read light with a wavelength of 633 nm, changes in accordance with the intensity of an address light inputted thereto;

FIG. 1($c$) is a diagram showing how a degree of phase modulation, attained by a spatial light modulator onto read light with a wavelength of 800 nm, changes in accordance with the intensity of an address light inputted thereto;

FIG. 2 is a diagram showing reflection characteristics of a dielectric multilayer-film mirror of a $\lambda/4$ type and of another dielectric multilayer-film mirror which is obtained by broadening the bandwidth of the dielectric multilayer-film mirror of a $\lambda/4$ type;

FIG. 5 is a table showing a film thickness distribution of a chirp compensation dielectric multilayer-film mirror in a first example employed in the spatial light modulator according to the embodiment;

FIG. 6($b$) is a diagram showing group delay characteristics of the chirp compensation dielectric multilayer-film mirror having the film thickness distribution of FIG. 5;

FIG. 8 is a table showing a film thickness distribution of the chirp compensation dielectric multilayer-film mirror in the second example employed in the spatial light modulator according to the embodiment;

FIG. 9($b$) is a diagram showing group delay characteristics of the chirp compensation dielectric multilayer-film mirror having the film thickness distribution of FIG. 8;

FIG. 12(a) and FIG. 12(b) are diagrams showing how the group delay characteristics of the spatial light modulator in the light pulse waveform controller of FIG. 11 change: wherein FIG. 12(a) is a diagram showing the group delay characteristics at time t0, and FIG. 12(b) is a diagram showing the group delay characteristics at time t1;

FIG. 13(a) to FIG. 13(e) are diagrams showing examples of waveform control attained by the light pulse waveform controller of FIG. 11: wherein FIG. 13(a) is a waveform diagram of a resultant output pulse obtained by compressing an incident light pulse; FIG. 13(b) is a waveform diagram of a resultant output pulse, in which the wavelength changes from the longer wavelength to the shorter wavelength; FIG. 13(c) is a waveform diagram of a resultant output pulse, in which the wavelength changes from the shorter wavelength to the longer wavelength; FIG. 13(d) is a waveform diagram of a resultant output pulse obtained by separating an incident light pulse so that a pulse having a shorter wavelength follows a pulse having a longer wavelength, and FIG. 13(e) is a waveform diagram of a resultant output pulse obtained by separating an incident light pulse so that a pulse having a longer wavelength follows a pulse having a shorter wavelength;

BEST MODE FOR CARRYING OUT THE INVENTION

Figure 1A:
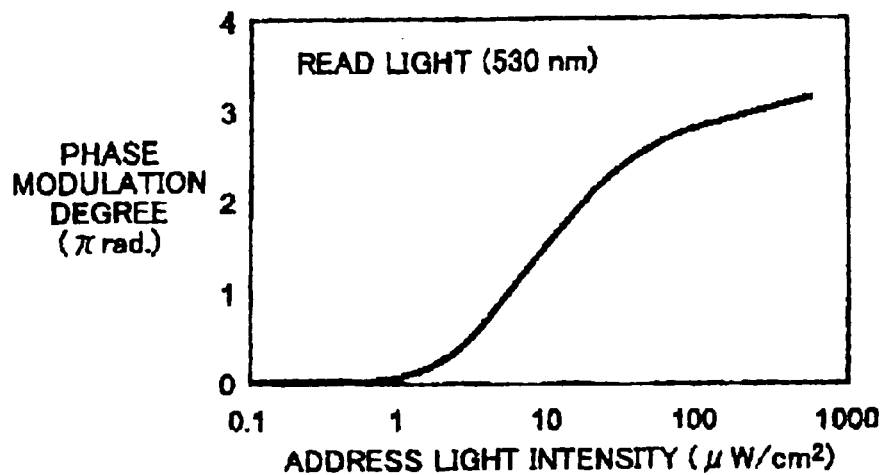
FIG. 1($a$) is a diagram showing how a degree of phase modulation, attained by a spatial light modulator onto read light with a wavelength of 530 nm, changes in accordance with the intensity of an address light inputted thereto.
Figure 1B:
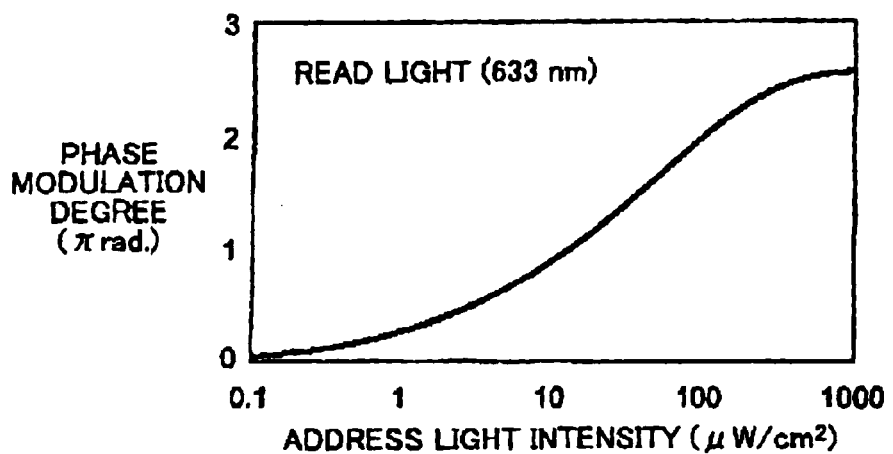
Figure 1C:
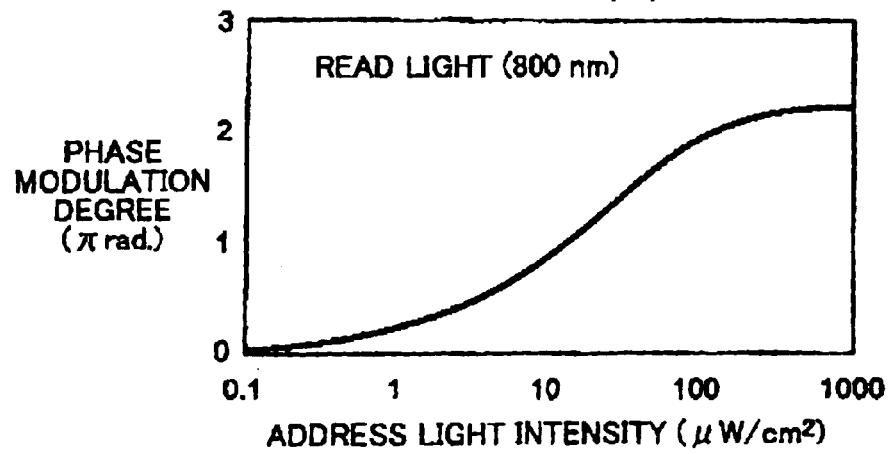
Figure 3:
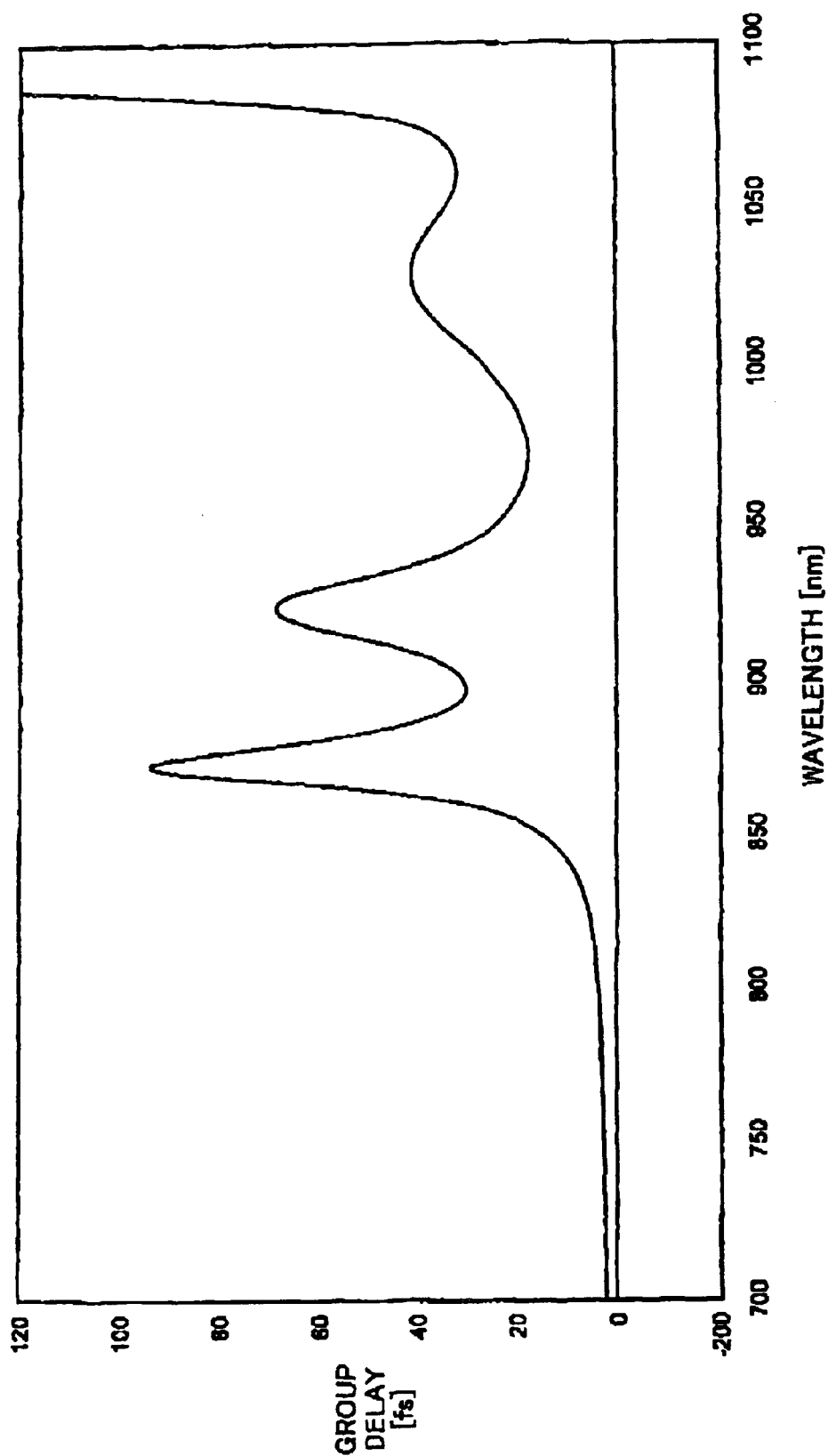
FIG. 3 is a diagram showing group delay characteristics of the dielectric multilayer-film mirror, which is obtained by broadening the bandwidth of the dielectric multilayer-film mirror of a $\lambda/4$ type.

A preferable embodiment of a spatial light modulator according to the present invention will hereinafter be described in detail with reference to the accompanying drawings. It is noted that the same or corresponding elements are designated with the same or corresponding reference numerals, and the repeated description is omitted.

A spatial light modulator 1 of the present embodiment will be described below with reference to FIG. 4 to FIG. 9(b).

Figure 4:
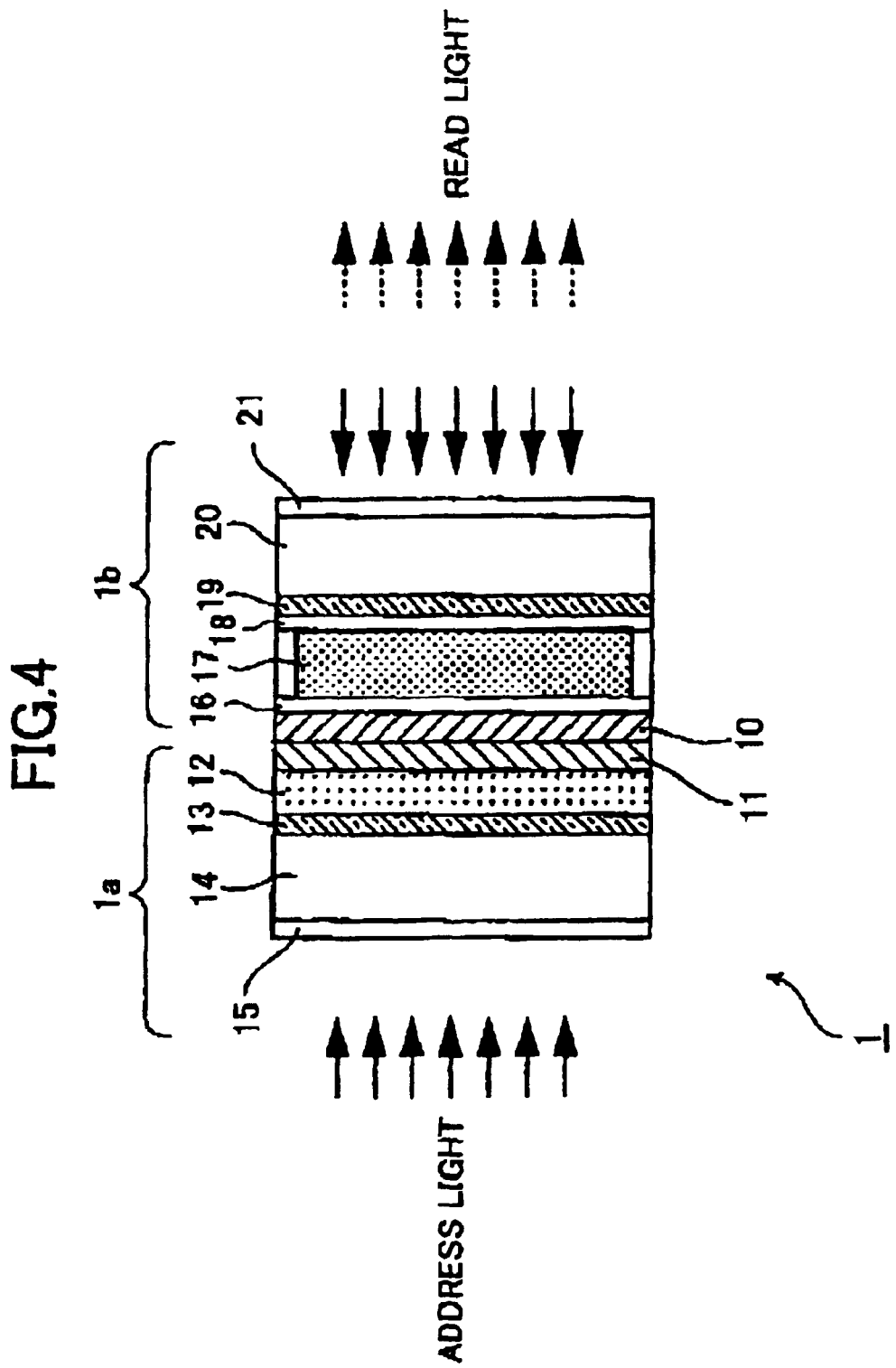
FIG. 4 is a schematic view showing the structure of a spatial light modulator according to an embodiment of the present invention.

FIG. 4 is a schematic view showing the configuration of the spatial light modulator 1 of the present embodiment. This spatial light modulator 1 has an address portion 1a and a read portion 1b. A light shielding layer 11 and a chirp compensation dielectric multilayer film mirror 10 are provided between the address portion 1a and the read portion 1b.

The light shielding layer 11 is for preventing read light that falls incident on the read portion 1b from leaking into the address portion 1a and also for preventing address light that falls incident on the address portion 1a from leaking into the read portion 1b.

In the address portion 1a, a photoconductive layer 12, a transparent electrode 13, a transparent substrate 14, and an antireflection coating 15 are provided on on another in this order from the light shielding layer 11 side. The photoconductive layer 12 is preferably made of amorphous silicon. The transparent electrode 13 is preferably made of an ITO (Indium-Tin-Oxide) film. The transparent substrate 14 is preferably made of a glass substrate.

In the read portion 1b, an orientation layer 16, a liquid crystal layer 17, another orientation layer 18, a transparent electrode 19, a transparent substrate 20, and an antireflection coating 21 are provided one on another in this order from the chirp compensation dielectric multilayer film mirror 10 side. In the liquid crystal layer 17, nematic liquid crystal molecules are homogeneously aligned in parallel with the transparent substrate 14. The transparent electrode 19 is preferably made of an ITO film. The transparent substrate 20 is preferably made of a glass substrate.

The chirp compensation dielectric multilayer film mirror 10 is for reflecting the read light that has fallen incident on the read portion 1b and that has been propagated through the parallel-aligned nematic liquid crystal layer 17. The chirp compensation dielectric multilayer film mirror 10 is formed by depositing titanium oxide ($TiO_2$) and silicon dioxide ($SiO_2$) one on another in alternation. In this chirp compensation dielectric multilayer film mirror 10, the titanium oxide ($TiO_2$) serves as a high refractive index material and the silicon dioxide ($SiO_2$) serves as a low refractive index material.

In this example, in the chirp compensation dielectric multilayer film mirror 10, the $TiO_2$ layers and the $SiO_2$ layers are provided alternately. The total number of the layers is 39. More specifically, layers of $TiO_2$ and $SiO_2$ are alternately provided from the first layer to the 39-th layer in order from the light shielding layer 11 side between the light shielding layer 11 and the orientation layer 16. The odd number-th layers (the first, the third, . . . , the 39-th layers) are formed of titanium oxide ($TiO_2$), while the even number-th layers (the second, the fourth, . . . , the 38-th layers) are formed of silicon dioxide ($SiO_2$). (It is noted that the k-th layer (k=1 to 39) from the light shielding layer 11 side will hereinafter be referred to as the k-th layer). The chirp compensation dielectric multilayer film mirror 10 having the above-described configuration is produced by depositing alternately $TiO_2$ and $SiO_2$ using a sputtering device or an evaporation device, for example.

With the above-described configuration, the read light is transmitted through the antireflection coating 21, the transparent substrate 20, the transparent electrode 19, and the orientation layer 18 in this order within the read portion 1b. The read light is then propagated through the liquid crystal layer 17. Thereafter, the read light is transmitted through the orientation layer 16 and is reflected by the chirp compensation dielectric multilayer film mirror 10. Then, the read light is transmitted through the orientation layer 16, and is propagated through the liquid crystal layer 17 again. The read light is then transmitted through the orientation layer 18, the transparent electrode 19, the transparent substrate 20, and the antireflection coating 21 in this order, before being outputted from the antireflection coating 21. Accordingly, the layers, other than the liquid crystal layer 17, in the read portion 1b (that is, the orientation layer 16, the other orientation layer 18, the transparent electrode 19, the transparent substrate 20, and the antireflection coating 21) serve as a light transmission portion for transmitting the read light therethrough.

With the above-described configuration, the spatial light modulator 1 can be used, for example, to modulate an ultrashort light pulse outputted from a titanium sapphire laser. The ultrashort light pulse, outputted from the titanium sapphire laser, contains wavelength components in a wavelength range of 700 to 1,000 nm, and hence has a wide spectrum width unlike a monochromatic light.

The spatial light modulator 1 having the above-described configuration operates as described below.

An ultrashort light pulse from a read light source, such as a titanium sapphire laser, (not shown) falls incident on the read portion 1b as shown in FIG. 4. The read light source produces an ultrashort light pulse of a linearly polarized light. The read light source is oriented so that the plane of polarization of the read light is aligned in parallel with the orientation direction of the liquid crystal molecules in the liquid crystal layer 17 of the spatial light modulator 1.

An alternating-current voltage of about 3 volts is applied between the transparent electrodes 13 and 19 from a power supply (not shown). It is noted that the impedance of the photoconductive layer 12 is sufficiently large. Accordingly, while the address portion 1a is irradiated with no address light, only a fixed small amount of voltage is applied through the liquid crystal layer 17. Hence, the liquid crystal molecules in the liquid crystal layer 17 are not changed.

When the address light falls incident on the address portion 1a, the address light passes through the transparent substrate 14 and falls incident on the photoconductive layer 12. The impedance of the part in the photoconductive layer 12 where the address light falls incident decreases, and the voltage supplied to the liquid crystal layer 17 is increased at a corresponding part, where the liquid crystal molecules are inclined accordingly. In this way, the refractive index is changed at each location of the liquid crystal layer 17 in correspondence with the intensity of the address light at the corresponding position. As a result, a refractive index distribution corresponding to the pattern of the address light is produced in the liquid crystal layer 17. The read light falling incident on the antireflection coating 21 of the read portion 1b passes through the transparent substrate 20, the transparent electrode 19, and the orientation layer 18 in this order, and finally reaches the liquid crystal layer 17. When the read light passes through the liquid crystal layer 17, the read light is modulated in phase at areas of the liquid crystal layer 17 that correspond to the areas of the address portion 1a where the address light falls incident. The read light whose phase has been modulated in this manner then passes through the orientation layer 16 and then is reflected by the chirp compensation dielectric multilayer film mirror 10. The read light then passes through the orientation layer 16 again, and passes through the liquid crystal layer 17, where the phase of the read light is further modulated. The read light then passes through the orientation layer 18, the transparent electrode 19, the transparent substrate 20, and the antireflection coating 21, before outputting to the outside from the antireflection coating 21.

By arbitrarily changing the address light falling incident on the address portion 1a, it is possible to actively and suitably change and adjust the phase modulation applied onto the read light that falls incident on the read portion 1b.

It is noted that the read light source may be located in another orientation that the plane of polarization in the read light is shifted by an angle of 45 degrees from the orientation direction of the liquid crystal molecules within the liquid crystal layer 17 of the spatial light modulator 1. In this case, the liquid crystal layer 17 will rotate the plane of polarization in the read light in accordance with the address light pattern. A polarizing element of a transmission type is located in a predetermined orientation, and is irradiated with an output light whose plane of polarization has been rotated by the liquid crystal layer 17 and which has been outputted from the liquid crystal layer 17. The output light will have intensity distribution corresponding to the address light pattern after having passed through the polarizing element. Thus, by providing the polarizing element in the subsequent or following stage of the spatial light modulator 1, it is possible to subject the read light to intensity modulation. It is noted that a polarizing element of a reflection type may be provided instead of the polarizing element of a transmission type. The polarizing element of a reflection type is located in another predetermined orientation, and is irradiated with the output light whose plane of polarization has been rotated by the liquid crystal layer 17 and which has been outputted from the liquid crystal layer 17. The output light will have the intensity distribution corresponding to the address light pattern after having reflected off the polarizing element.

In the spatial light modulator 1 of this embodiment, the chirp compensation dielectric multilayer film mirror 10 reflects the incident light in the predetermined wavelength range (in this case, 700 to 1000 nm). The chirp compensation dielectric multilayer film mirror 10 also has group delay characteristics that prevent at least one of the dielectric multilayer film mirror 10 and the light transmission portion (that is, the orientation layers 16 and 18, the transparent electrode 19, the transparent substrate 20, and the antireflection coating 21) from applying a phase disturbance to the incident light within the predetermined wavelength range. Accordingly, all the wavelength components of the incident light in the predetermined wavelength range are reflected by the chirp compensation dielectric multilayer film mirror 10. The phase of the incident light does not suffer from any additional undesired disturbance.

Some examples of the configuration of the chirp compensation dielectric multilayer film mirror 10 will be described below.

FIRST EXAMPLE

In a first example, the chirp compensation dielectric multilayer film mirror 10 reflects the incident light within the predetermined wavelength range (700 to 1,000 nm in this example), and has uniform amount of group delay within the predetermined wavelength range. For this reason, all the wavelength components of the incident light in the predetermined wavelength range are reflected by the chirp compensation dielectric multilayer film mirror 10. The phase of the incident light is applied with no disturbance while the incident light is being reflected at the chirp compensation dielectric multilayer film mirror 10.

The thickness of each layer constituting the chirp compensation dielectric multilayer film mirror 10 of this example is set so that its corresponding optical film thickness has a value shown in FIG. 5. It is noted that the optical film thickness of each layer is defined by a product of the refractive index of a material constituting the subject layer and an actual thickness of the subject layer. It is noted that the refractive index of titanium oxide is 2.25, and the refractive index of silicon dioxide is 1.45.

Figure 6A:
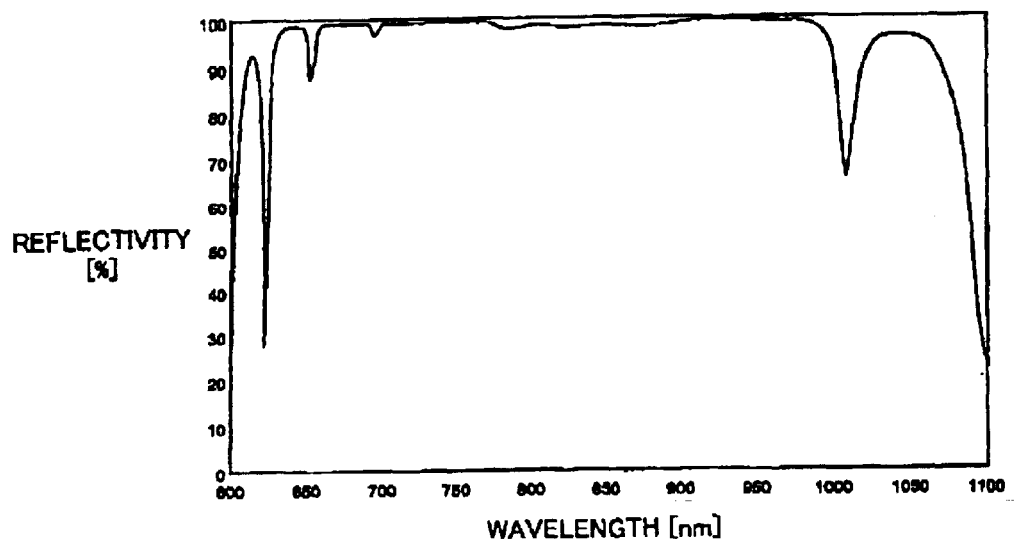
FIG. 6($a$) is a diagram showing reflection characteristics of the chirp compensation dielectric multilayer-film mirror having the film thickness distribution of FIG. 5.
Figure 6B:
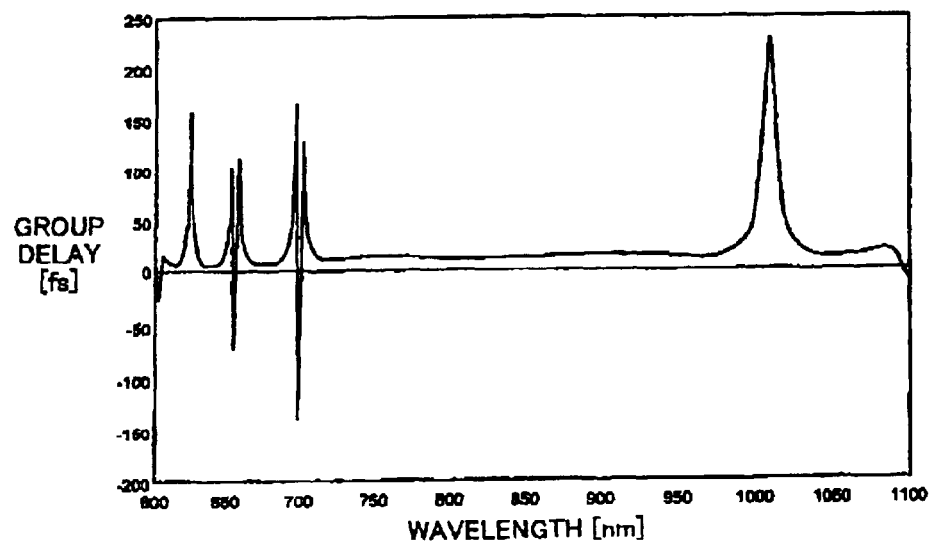

The chirp compensation dielectric multilayer film mirror 10 having such a film thickness distribution has a sufficiently high reflection ability over the broad range of 700 nm to 1,000 nm as shown in FIG. 6(a), and has an uniform amount of group delay over the broad range of 700 nm to 1000 nm as shown in FIG. 6(b).

In this way, the chirp compensation dielectric multilayer film mirror 10, having the film thickness distribution of FIG.

5, can reflect the light with the wavelengths of 700 nm to 1,000 nm with high reflectivity, contrarily to the general type of λ/4 multilayer film mirror as described already with reference to curve "a" in FIG. 2. For this reason, the chirp compensation dielectric multilayer film mirror 10 can efficiently reflect all the wavelength components of the read light that is emitted from the titanium sapphire laser. Moreover, the multilayer film structure of the chirp compensation dielectric multilayer film mirror 10 is adjusted to attain a uniform amount of group delay irrespective of the wavelength. The chirp compensation dielectric multilayer film mirror 10 has no dispersion of the group delay amount with respect to the wavelength of the read light. Accordingly, when the read light is reflected at the chirp compensation dielectric multilayer film mirror 10, the phase of the read light will be applied with no undesired disturbance. When the chirp compensation dielectric multilayer film mirror 10 reflects the read light, the chirp compensation dielectric multilayer film mirror 10 applies no undesired disturbance onto the phase of the read light. Accordingly, the spatial light modulator 1 of this embodiment can attain highly-accurate phase modulation onto the read light.

The chirp compensation dielectric multilayer film mirror 10 of this example is preferable especially in the case where all the layers constituting the light transmission portion (that is, the orientation layers 16 and 18, the transparent electrode 19, the transparent substrate 20, and the antireflection coating 21) apply a very small and negligible amount of group-delay dispersion (phase dispersion) onto the read light when those layers transmit the read light therethrough. Accordingly, in this case, the chirp compensation dielectric multilayer film mirror 10 applies no additional undesired disturbance onto the phase of the read light when reflecting the read light, and all the constituent members constituting the light transmission portion apply no additional undesired disturbance onto the phase of the read light when transmitting the read light therethrough. Accordingly, the spatial light modulator 1 can apply to the read light only the desired phase modulation occurred by the liquid crystal layer 17.

SECOND EXAMPLE

In this example, the chirp compensation dielectric multilayer film mirror 10 reflects the incident light in the predetermined wavelength range (700 to 1,000 nm in this example), and also has the group delay characteristics for compensating for the group delay caused by the light transmission portion within the predetermined wavelength range. Accordingly, all the wavelength components of the incident light in the predetermined wavelength range are reflected by the chirp compensation dielectric multilayer film mirror 10. The disturbance of a phase, which is applied to the incident light when the incident light passes through the light transmission portion, is cancelled out when the incident light is reflected at the chirp compensation dielectric multilayer film mirror 10. Accordingly, the incident light is applied with the desired modulation by the liquid crystal layer 17 and is not applied with any additional undesired phase-disturbance.

Figure 7:
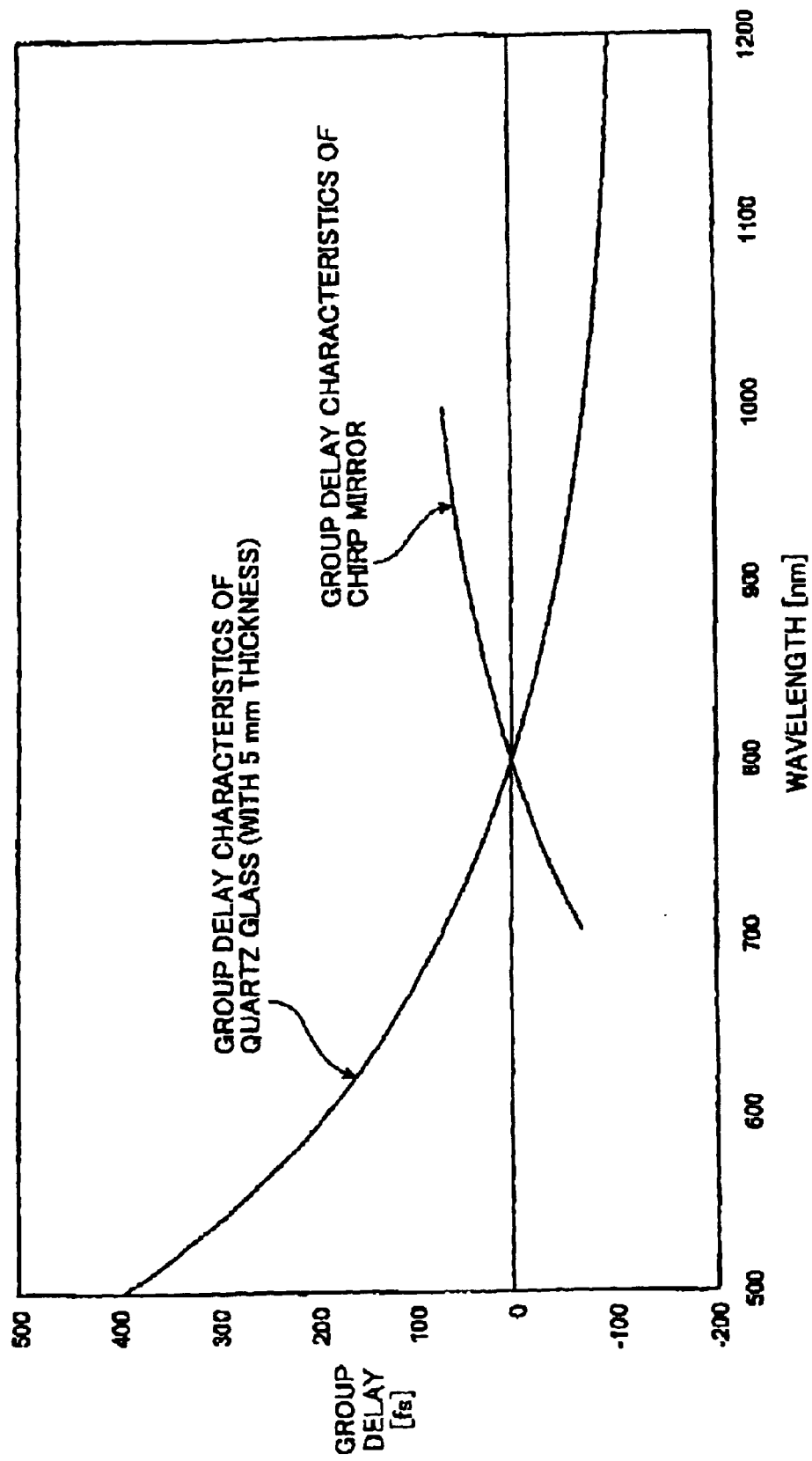
FIG. 7 is a diagram showing group delay characteristics of a transparent substrate in a spatial light modulator according to a second example.

In this example, the transparent substrate 20 is made of a quartz plate with 5 mm thickness, and has the group delay characteristics shown in FIG. 7 in the wavelength range of 700 nm to 1,000 nm. Accordingly, when the read light passes through the transparent substrate 20, the phase of the read light suffers from undesired disturbance.

Figure 9A:
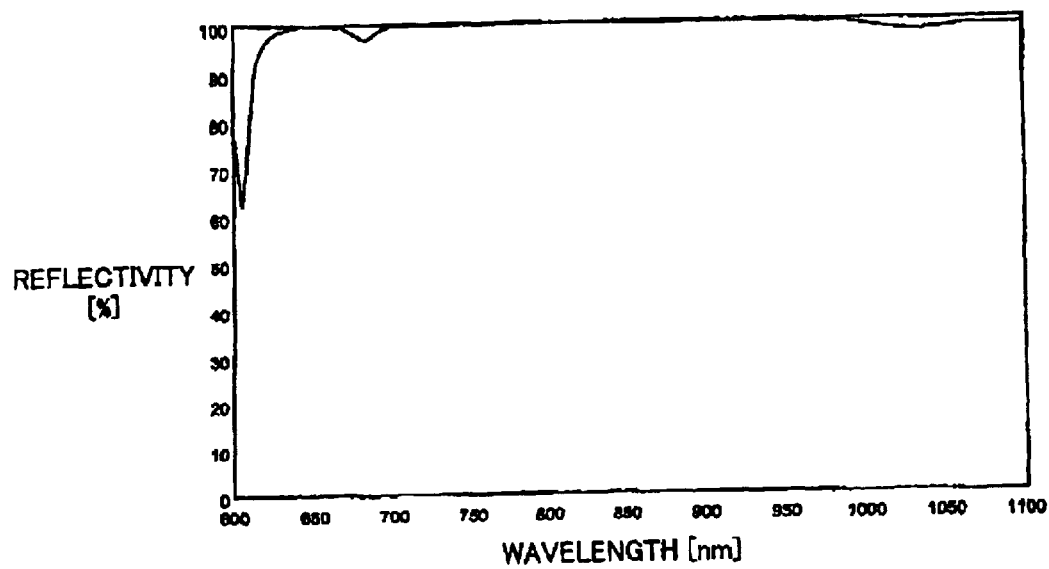
FIG. 9($a$) is a diagram showing reflection characteristics of the chirp compensation dielectric multilayer-film mirror having the film thickness distribution of FIG. 8.
Figure 9B:
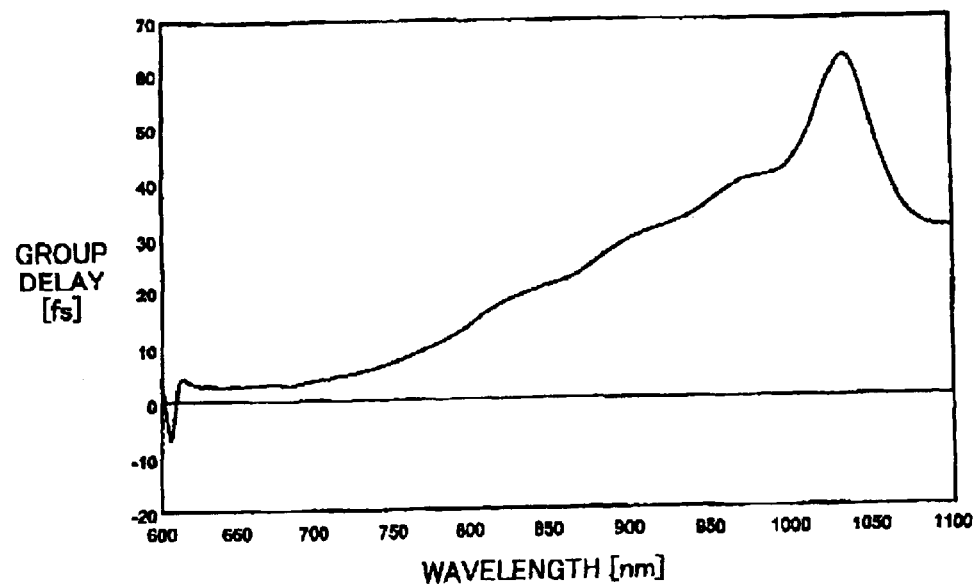

In this example, the thickness of each layer in the chirp compensation dielectric multilayer film mirror 10 is set so that the optical film thicknesses of each layer has the value as shown in FIG. 8. The chirp compensation dielectric multilayer film mirror 10 having such a film thickness distribution attains the reflection characteristics over a broad wavelength range as shown in FIG. 9(a), and has the group delay characteristics as shown in FIG. 9(b). A curve indicative of the group delay characteristics in FIG. 9(b) has such a shape that is obtained by reversing the sign (plus or minus) of the group-delay characteristics curve (FIG. 7) of the transparent substrate 20 for the wavelength range of 700 nm to 1000 nm. By using such group delay characteristics, the chirp compensation dielectric multilayer film mirror 10 can cancel out the phase-disturbance of the read light that is caused by the transparent substrate 20.

As described above, in this example, the chirp compensation dielectric multilayer film mirror 10 having the film thickness distribution of FIG. 8 reflects off all the wavelength components of the read light, and has the group delay characteristics compensating for the group delay dispersion that is caused by the transparent substrate 20 with respect to the wavelength. Accordingly, the chirp compensation dielectric multilayer film mirror 10 reflects all the wavelength components of the read light. When reflecting the read light, the chirp compensation dielectric multilayer film mirror 10 cancels out the phase-disturbance which the transparent substrate 20 applies to the read light while the transparent substrate 20 transmits the read light therethrough.

In this way, according to this example, the disturbance of a phase, which is applied to the read light when the read light passes through the transparent substrate 20, is cancelled out when the read light is reflected at the chirp compensation dielectric multilayer film mirror 10. Accordingly, by employing the chirp compensation dielectric multilayer film mirror 10 of this example, the spatial light modulator 1 can provide the highly-accurate phase modulation onto the read light without giving any undesired additional phase-disturbance onto the read light.

The chirp compensation dielectric multilayer film mirror 10 of this example is effective especially in the case where remaining layers other than the transparent substrate 20 in the light transmission portion (that is, the orientation layer 16, the other orientation layer 18, the transparent electrode 19, and the antireflection coating 21) supply only a small and negligible amount of phase disturbance onto the read light. In such a case, when the chirp compensation dielectric multilayer film mirror 10 reflects the read light, the chirp compensation dielectric multilayer film mirror 10 cancels out the phase-disturbance which is caused by the transparent substrate 20. No additional undesired disturbance will be supplied onto the phase of the read light when the read light passes through the other remaining members in the light transmission portion. Accordingly, the spatial light modulator 1 can provide only the desired phase modulation by the liquid crystal layer 17 to the read light.

(Third Example)

In the above-described second example, the chirp compensation dielectric multilayer film mirror 10 compensates for the phase disturbance caused by the transparent substrate 20. However, if the phase-disturbance caused by any other one of the constituent layers in the light transmission portion (that is, the orientation layer 16 or 18, the transparent electrode 19, or the antireflection coating 21) becomes large and noticeable, it is preferable to design the film thickness distribution of the chirp compensation dielectric multilayer film mirror 10 so that the chirp compensation dielectric multilayer film mirror 10 will have such group delay characteristics that cancel the influence of the group delay by the disturbance-cuasing layer.

In addition, if the phase disturbance caused by more than one or all of the constituent layers of the light transmission portion (that is, the orientation layers 16 and 18, the transparent electrode 19, the transparent substrate 20, and the antireflection coating 21) is noticeable, it is preferable to design the film thickness distribution of the chirp compensation dielectric multilayer film mirror 10 so that the chirp compensation dielectric multilayer film mirror 10 will have such group delay characteristics that can totally cancel out the influences of the group delay by all the disturbance-causing layers.

More specifically, the film thickness distribution of the chirp compensation dielectric multilayer film mirror 10 is designed so that the chirp compensation dielectric multilayer film mirror 10 will have a sufficiently high reflection ability over the wide wavelength range (700 nm to 1,000 nm in this example) of the read light similarly to the second example and so that the chirp compensation dielectric multilayer film mirror 10 will have such group delay characteristics that are obtained by reversing the sign (plus or minus) of the total sum of the group delay characteristics caused by all the disturbance-causing layers.

With such a film thickness distribution, the chirp compensation dielectric multilayer film mirror 10 reflects all the wavelength components in the read light. When reflecting the read light, the chirp compensation dielectric multilayer film mirror 10 cancels out the total sum of the phase-disturbance which is applied to the read light when the read light passes through the light transmission portion. Accordingly, the spatial light modulator 1 can provide only the desired phase modulation by the liquid crystal layer 17 onto the read light without applying any additional undesired phase disturbance onto the output light.

It is assumed that among all the constituent members in the light transmission portion (that is, the orientation layers 16 and 18, the transparent electrode 19, the transparent substrate 20, and the antireflection coating 21), some constituent member has a smaller thickness than other constituent members. In such a case, even if the thin constituent member applies the read light with some group delay dispersion, the amount of its group delay dispersion is generally very small. The chirp compensation dielectric multilayer film mirror 10 does not have to compensate for such a small amount of group delay dispersion that is caused by the thin layer.

As described above, according to the spatial light modulator 1 of the present embodiment, the chirp compensation dielectric multilayer film mirror 10 reflects all the wavelength components of the read light and has such group delay characteristics that prevents all the wavelength components of the read light from suffering from no additional undesired phase disturbance. For example, the chirp compensation dielectric multilayer film mirror 10 may have the uniform amount of group delay. Or, the chirp compensation dielectric multilayer film mirror 10 may have such group delay characteristics that compensate for the group delay caused by the light transmission portion. Thus, the chirp compensation dielectric multilayer film mirror 10 serves to reflect all the wavelength components of the read light, while applying no phase disturbance onto the read light or canceling out the phase disturbance caused by the light transmission portion. Accordingly, the spatial light modulator 1 can provide the read light with only the desired phase modulation that is caused by the liquid crystal layer 17, while providing the read light with no additional undesired phase disturbance.

(Method of Designing Film Thickness Distribution)

Next will be described how to determine the optical film thickness $n_k d_k$ of each layer (the k-th (k=1 to 39) layer) in order to produce the chirp compensation dielectric multilayer film mirror 10 that has a sufficient reflection ability over the desired bandwidth (the broad range from 700 nm to 1,000 nm) and that also has the desired group delay characteristics over the desired wavelength range. It is noted that $n_k$ is refractive index of the k-th layer, and $d_k$ is a layer thickness of the k-th layer. It is noted that $n_k$ is 2.25 for k=odd number (the layer of titanium oxide), and $n_k$ is 1.45 for k=even number (the layer of silicon dioxide).

First of all, a fixed value (of 95% or 99%) is set as a value of reflectivity $R(\lambda)$ that indicates the sufficient reflection ability for the whole wavelength $\lambda$ in the desired wavelength range ($\lambda$=700 nm to 1,000 nm, in this example). That is, the following equation is set:

$$R(\lambda) = 0.95 \text{ or } 0.99.$$

Next, a group delay function $t=T(\lambda)$ is set as the desired group delay characteristics for the desired wavelength range ($\lambda$=700 nm to 1,000 nm, in this example).

In order to produce the chirp compensation dielectric multilayer film mirror 10 of the first example, the desired group delay amount is uniform irrespective of the value of the wavelength $\lambda$. Accordingly, the group delay function $T(\lambda)$ is set to a value that is fixed irrespective of the waveform $\lambda$. That is, the following equation is set:

$$T(\lambda) = \text{fixed value}$$

As to the second example, it is noted that the group delay amount of the transparent substrate 20 decreases monotonously with the wavelength $\lambda$ as shown in FIG. 7. Accordingly, the group delay function $T(\lambda)$ is set as a function that is obtained by reversing the sign (plus or minus) of the group delay characteristics of FIG. 7. More specifically, the group delay function $T(\lambda)$ is set as a function curve that increases monotonously with the wavelength $\lambda$ with its gradient indicative of its changing rate having such a value that is obtained by reversing the sign (plus or minus) of the gradient of the group delay characteristics curve of the transparent substrate 20.

In order to produce the chirp compensation dielectric multilayer film mirror 10 of the third example, the group delay function $T(\lambda)$ is set as such a group delay characteristics curve that is obtained by reversing the sign (plus or minus) of: the group delay characteristics of one layer having the group delay dispersion; or the total sum of the group delay characteristics of more than one layer having the group delay dispersion. For example, it is assumed that the group delay amount of one layer having the group delay dispersion or the total sum of the group delay amounts of more than one layer having the group delay dispersion decreases monotonously with the wavelength. In this case, the group delay $T(\lambda)$ is set as such a function that increases monotonously with the wavelength. On the other hand, if the group delay amount of one layer having the group delay dispersion or the total sum of the group delay amounts of more than one layer having the group delay dispersion increases monotonously with the wavelength, the group delay $T(\lambda)$ is set as such a function that decreases monotonously with the wavelength. The increasing or decreasing rate of the group delay amount $T(\lambda)$, that is, the gradient of the curve $T(\lambda)$, is set so as to cancel out an estimated phase shift, which will be caused by the one or more layers having the group delay dispersion. For example, the group delay $T(\lambda)$ may be set to such a function that increases or decreases substantially linearly.

Next, the optical film thickness $n_k d_k$ of each layer is determined in a manner described below.

A first difference is defined for each wavelength λ as a difference between the desired reflectivity R(λ) and reflectivity $|\gamma_{k+1,k}|^2$ of each layer (k-th (k=1 to 39) layer) constituting the chirp compensation dielectric multilayer film mirror 10. The reflectivity $|\gamma_{k+1,k}|^2$ of each layer is defined as the square of the absolute value in the complex amplitude reflectivity $\gamma_{k+1,k}$ of the subject layer. A total sum of the first differences is defined as the total sum of the first differences for all the wavelengths λ that are arranged at an 1-nm interval in the desired wavelength range (λ=700 nm to 1000 nm, in this example).

A second difference is defined for each wavelength λ as a difference between the desired group delay T(λ) and a value (d $\Phi_{k+1,k}$/dω) of each layer (k-th layer). The value (d $\Phi_{k+1,k}$/dω) of each layer is defined as a first derivative of the angle of deflection $\Phi_{k+1,k}$ in the complex amplitude reflectivity $\gamma_{k+1,k}$ of the subject layer with respect to the angular frequency ω. A total sum of the second differences is defined as the total sum of the second differences for all the wavelengths λ that are arranged at the 1-nm interval in the desired wavelength range (λ=700 nm to 1000 nm, in this example).

The optical film thickness $n_k d_k$ of each layer is determined so that both of the total sum of the first differences and the total sum of the second differences will become nearest to zero (0).

More specifically, first of all, the evaluation expression G(λ) of the group delay is set in the form of the following expression (1), and the evaluation expression H(λ) of the reflectivity is set in the form of the following expression (2):

$$G(\lambda) = \sum_\lambda \{T(\lambda) - d\Phi_{k+1,k}/d\omega\}^2 \quad (1)$$

$$H(\lambda) = \sum_\lambda \{R(\lambda) - |\gamma_{k+1,k}|^2\}^2 \quad (2)$$

wherein ω is 2π·c/λ, and $\Phi_{k+1,k}$=tan$^{-1}$ [(imaginary part of $\gamma_{k+1,k}$)/(real part of $\gamma_{k+1,k}$)].

It is noted that the complex amplitude reflectivity $\gamma_{k+1,k}$ of the k-th layer is expressed by the following expression (3):

$$\gamma_{k+1,k} = \frac{[r_{k+1} + \gamma_{k,k-1} \cdot \exp(-2i \cdot (2\pi/\lambda) \cdot n_k \cdot d_k \cdot \cos\theta_k)]}{[(1 + \gamma_{k,k-1} \cdot r_{k+1} \cdot \exp(-2i \cdot (2\pi/\lambda) \cdot n_k \cdot d_k \cdot \cos\theta_k)]} \quad (3)$$

If the complex amplitude reflectivity $\gamma_{k+1,k}$ is expressed in the form of a complex number "a+bi" (where "a" and "b" are real numbers), then $\Phi_{k+1,k}$ is expressed in the form of tan$^{-1}$(b/a).

It is noted that $r_k$ is a Fresnel coefficient of the k-th layer. That is, $r_k$ is defined by the following equation: $r_k=(n_k-n_{k-1})/(n_k+n_{k-1})$.

In addition, the complex amplitude reflectivity $\gamma_{1,0}$ of the 0-th layer (the light shielding layer 11) is equal to the Fresnel coefficient of the first layer. That is, $\gamma_{1,0}$ is defined by the following equation: $\gamma_{1,0}=r_1=(n-n0)/(n1+n0)$.

Also, the value cos θk is defined by the following equation:

$$\cos\theta k = [1 - \{(n_{orientation\ layer}/n_k) \times \sin\theta_{orientation\ layer}\}^2]^{1/2}$$

wherein $n_{k-odd\ number}$=2.25 (refractive index of TiO$_2$), $n_{k-even\ number}$=1.45 (refractive index of SiO$_2$), $n_{k=0}$=1.6 (refractive index of the light shielding layer 11), $n_{orientation\ layer}$=1.6 (refractive index of the incident medium, in this case, the orientation layer 16), $\theta_{orientation\ layer}$=0°. It is noted that $\theta_{orientation\ layer}$ of 0° is the incident angle of the read light falling incident on the incident interface vertically. The incident interface is defined between the 39-th layer and the orientation layer 16. The read light falls incident on the 39-th layer from the orientation layer 16 (an incident medium).

The above-described evaluation expressions G(λ) and H(λ) serve as multivariable functions for the optical film thickness $n_k d_k$ of the respective layers. Accordingly, it is possible to determine the optical film thickness $n_k d_k$ of each layer that allows both of these evaluation expressions G(λ) and H(λ) to become close to zero (0) by determining the minimum peak values of the multivariable functions G(λ) and H(λ). More specifically, each variable $n_k d_k$ that allows both of the evaluation expressions G(λ) and H(λ) to become close to zero (0) can be determined by using a well-known mathematical technique, such as a Simulated annealing method (SA method) or a Simplex method, which determines the peak value of a general multivariable function. For example, if a predetermined fixed value is set as T(λ) as in the first example, the optical film thicknesses $n_1 d_1$ to $n_{39} d_{39}$ of the first to 39-th layers can be determined as shown in FIG. 5. If the predetermined monotone increasing function shown in FIG. 7 is set as T(λ) as in the second example, the optical film thicknesses $n_1 d_1$ to $n_{39} d_{39}$ of the first to 39-th layers can be determined as shown in FIG. 8.

After the optical film thicknesses $n_1 d_1$ to $n_{39} d_{39}$ of all the layers are determined, the chirp compensation dielectric multilayer film mirror 10 is produced by controlling the sputtering operation and the evaporation operation so that each layer (the k-th layer) is formed to have the determined film thickness $d_k$.

As described above, the spatial light modulator 1 of the present embodiment applies no additional undesired dispersion of the group delay to the read light. More specifically, when the read light is reflected by the chirp compensation dielectric multilayer film mirror 10, the read light is applied with no dispersion of the group delay. Or, even when the read light is applied with some dispersion of the group delay when the read light passes through the light transmission portion, this dispersion of the group delay is canceled out by the chirp compensation dielectric multilayer film mirror 10. Accordingly, the read light can be applied with only the modulation by the liquid crystal layer 17, which is controlled by the address light, and hence the read light can be applied with the desired modulation accurately. By arbitrarily changing the address light falling incident on the address portion 1a, it is possible to actively and suitably change and adjust the amount of the desired modulation.

Figure 10:
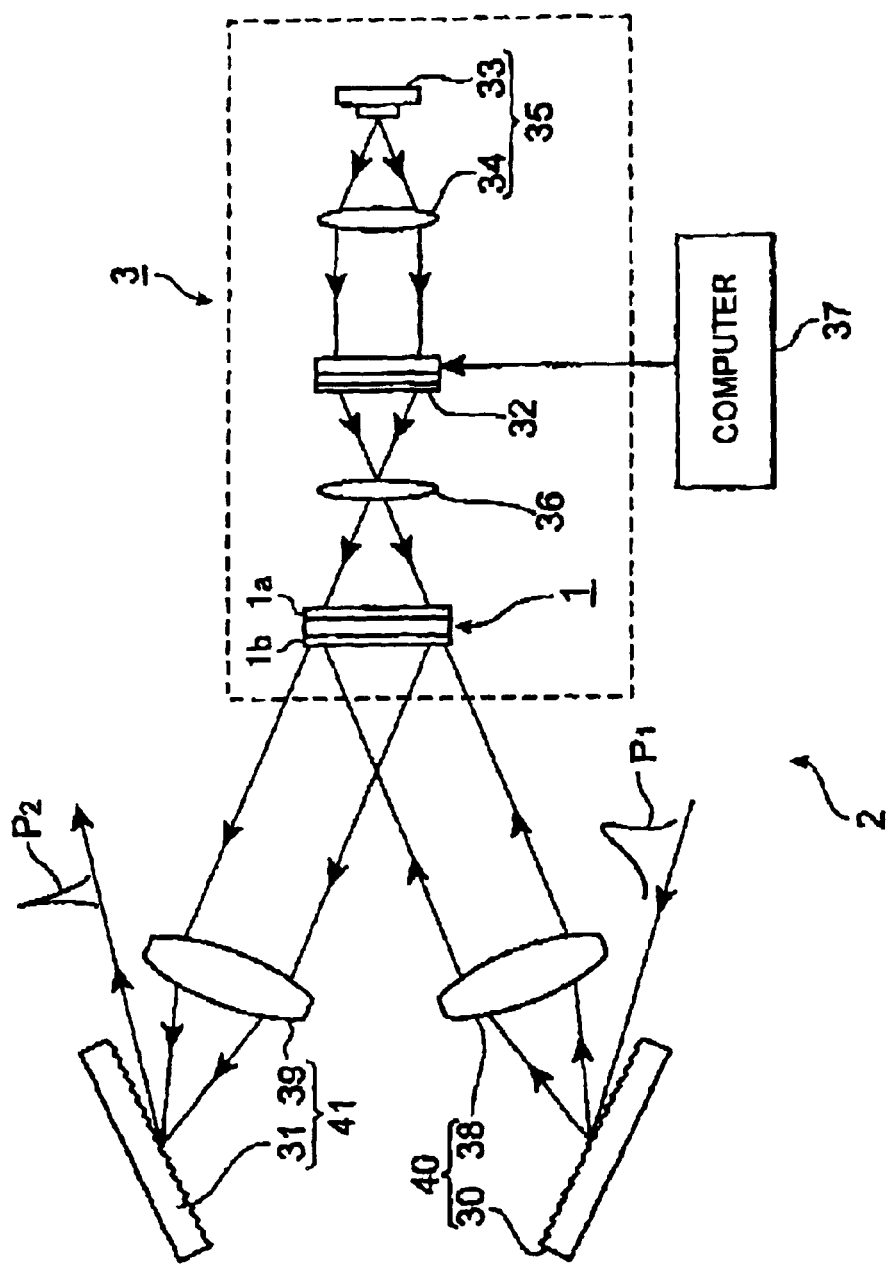
FIG. 10 shows the structure of a light pulse waveform controller that has a phase-modulation spatial light modulating device provided with the spatial light modulator according to the embodiment.

It is possible to produce a light pulse waveform controller 2 as shown in FIG. 10, for example, by employing the spatial light modulator 1 of FIG. 4.

The light pulse waveform controller 2 will be described below in detail.

The light pulse waveform controller 2 is for modulating the phase of an inputted pulse light P$_1$, thereby subjecting the pulse light P$_1$ to a pulse waveform control, such as a pulse compression, and producing another pulse light P$_2$.

As shown in FIG. 10, the light pulse waveform controller 2 includes: a phase-modulation spatial light modulating device 3; an input optical system 40 for guiding the pulse light P$_1$ to fall incident on the phase-modulation spatial light modulating device 3; and an output optical system 41 for outputting, as the pulse light P$_2$, the pulse light which has been phase-modulated by the phase-modulation spatial light modulating device 3.

The phase-modulation spatial light modulating device 3 includes the spatial light modulator 1 that has the configuration of FIG. 4 and that includes the chirp compensation dielectric multilayer film mirror 10 having the film thickness distribution of either one of the first to third examples.

The phase-modulation spatial light modulating device 3 is further provided with an addressing light source 35, a liquid crystal element 32 of a transmission type, and an imaging lens 36.

A computer 37 is connected to the transmission type liquid crystal element 32. The computer 37 produces an image signal based on an address pattern indicative of a phase pattern that represents the amount of the desired phase modulation to be subjected to the pulse light.

The addressing light source 35 includes: a laser diode 33 for producing write light having a uniform intensity distribution; and a collimator lens 34 for collimating the write light into a parallel light beam.

Pixels in the transmission type liquid crystal element 32 are selectively controlled by the image signal from the computer 37 so as to selectively modulate the parallel light from the collimator lens 34, thereby producing an intensity-modulated light bearing thereon the address pattern.

The imaging lens 36 is for imaging the thus produced intensity-modulated light onto the photoconductive layer 12 (FIG. 4) of the spatial light modulator 1 through the transparent substrate 14.

The input optical system 40 includes: a grating 30 and a collimator lens 38. The grating 30 is for separating the incident light pulse $P_1$ into its spectral components. The collimator lens 38 is for gathering or condensing the incident light, which has been spectrally separated by the grating 30, and causing the incident light to fall incident on the liquid crystal layer 17 (FIG. 4) of the spatial light modulator 1 through the transparent substrate 20. It is noted that the phase modulation spatial light modulating device 3 is located in such an orientation that the orientation direction of the liquid crystal molecules within the liquid crystal layer 17 in the spatial light modulator 1 is aligned in parallel with the direction of the polarization of the incident light falling incident on the spatial light modulator 1.

The output optical system 41 includes: another collimator lens 39 and another grating 31. The collimator lens 39 is for gathering or condensing an output light outputted from the read portion 1b of the spatial light modulator 1. The grating 31 is for combining or composing together the light gathered or condensed by the collimator lens 39, and outputting the composed light as the output light pulse $P_2$.

With the above-described configuration, the light pulse waveform controller 2 operates as described below.

When the pulse light $P_1$ falls incident on the grating 30, the pulse light $P_1$ is separated by the grating 30 into its spectral components so that the spectral components are distributed one-dimensionally. The pulse light $P_1$ is then condensed by the collimator lens 38 and falls incident on the read portion 1b of the spatial light modulator 1. Thus, the incident light falls incident on the read portion 1b, with its constituent wavelength components being spatially separated from one another one-dimensionally. On the other hand, the write light emitted from the laser diode 33 is collimated by the collimator lens 34 and falls incident on the transmission-type liquid crystal element 32 and selectively passes through the pixels of the transmission type liquid crystal element 32 that is controlled by the computer 37, thereby being converted into address light having phase-control amount information. The address light is imaged by the imaging lens 36 to fall incident on the address portion 1a of the spatial light modulator 1. The liquid crystal molecules within the liquid crystal layer 17 of the read portion 1b in the spatial light modulator 1 are changed in accordance with the pattern of the address light. As a result, the incident light is subjected, at each wavelength, to a corresponding specific phase modulation that corresponds to the pattern of the address light, and is outputted as an output light that has at each wavelength a corresponding desired phase. The output light is then condensed by the collimator lens 39, and is composed by the grating 31 and outputted as an ultrashort light pulse $P_2$, onto which the desired phase control has been attained.

Because the chirp compensation dielectric multilayer film mirror 10 has the film thickness distribution in either one of the first to third examples, the light pulse waveform controller 2 can apply the ultra-short pulse $P_1$ with the desired phase modulation with high accuracy without applying any additional undesired disturbance to the phase of the ultrashort light pulse $P_1$.

The light pulse waveform controller 2 may be located, for example, in the transmission path that attains optical communication using an ultrashort light pulse. The light pulse waveform controller 2 is used to receive, as the incident pulse light $P_1$, the pulse light whose pulse width has been broadened during its transmission through the transmission path, and to restore the pulse light $P_1$ back to the pulse $P_2$ having the desired pulse width by executing the pulse compression. It is assumed that while the pulse light is being transmitted through the transmission path, the pulse light is propagated through such a medium as a lens, a window material, or the air atmosphere that causes wavelength dispersion in the group delay of the pulse light. In such a medium, the velocity of the light becomes different for each wavelength within the pulse light. Accordingly, the phase of the light is disturbed and the pulse width spreads in the medium. However, it is possible to shorten the pulse width by locating the light pulse waveform controller 2 in the transmission path and by controlling the light pulse waveform controller 2 to execute a desired phase modulation to cancel out the group delay that is caused by the medium and that differs for each wavelength. In addition, by the computer 37 changing the image signal, it is possible to actively and suitably change and adjust the pulse compression. Moreover, within the spatial light modulator 1, no additional undesired group delay dispersion is caused by the chirp compensation dielectric multilayer film mirror 10, or even if the group delay is caused by the light transmission portion, the group delay is cancelled out by the chirp compensation dielectric multilayer film mirror 10. Accordingly, the phase modulation by the liquid crystal layer 17 only can be applied onto the light. Consequently, the desired pulse compression can be carried out with accuracy.

A liquid crystal element of a reflection type may be used instead of the transmission-type liquid crystal element 32.

In addition, in order to spectrally separate or compose pulse light, spectral-component separating elements of a transmission type, such as prisms, may be used instead of the gratings 30 and 31.

Also, the pulse light may be separated into its spectral components so that the spectral components are distributed two-dimensionally instead of one-dimensionally. By thus spectrally separating the pulse light two-dimensionally, it is possible to further effectively utilize the modulation ability of the spatial light modulator 1. In order to spectrally separate the pulse light two-dimensionally, the echelle diffraction grating or the like can be used, for example.

Next will be described with reference to FIG. 11 another light pulse waveform controller 6, to which the spatial light modulator 1 of FIG. 4 according to the present embodiment is applied.

In general, the waveform of the ultrashort pulse light of a multi-longitudinal mode is expressed by the following expression (4):

$$E(t) = \sum_n E_n \exp i(\omega_n + \phi_n) \quad (4)$$

As apparent from Expression (4), there is a case in which the pulse width may not be controlled efficiently if only the phase $\Phi_n$ of the pulse at each mode n is controlled. In this case, it is preferable to control not only the phase but also the electric field $E_n$, that is, intensity of the pulse at each mode n. Considering such a case, the light pulse waveform controller 6 of the present embodiment controls both of the phase and the intensity of the light pulse to execute the pulse waveform control.

Figure 11:
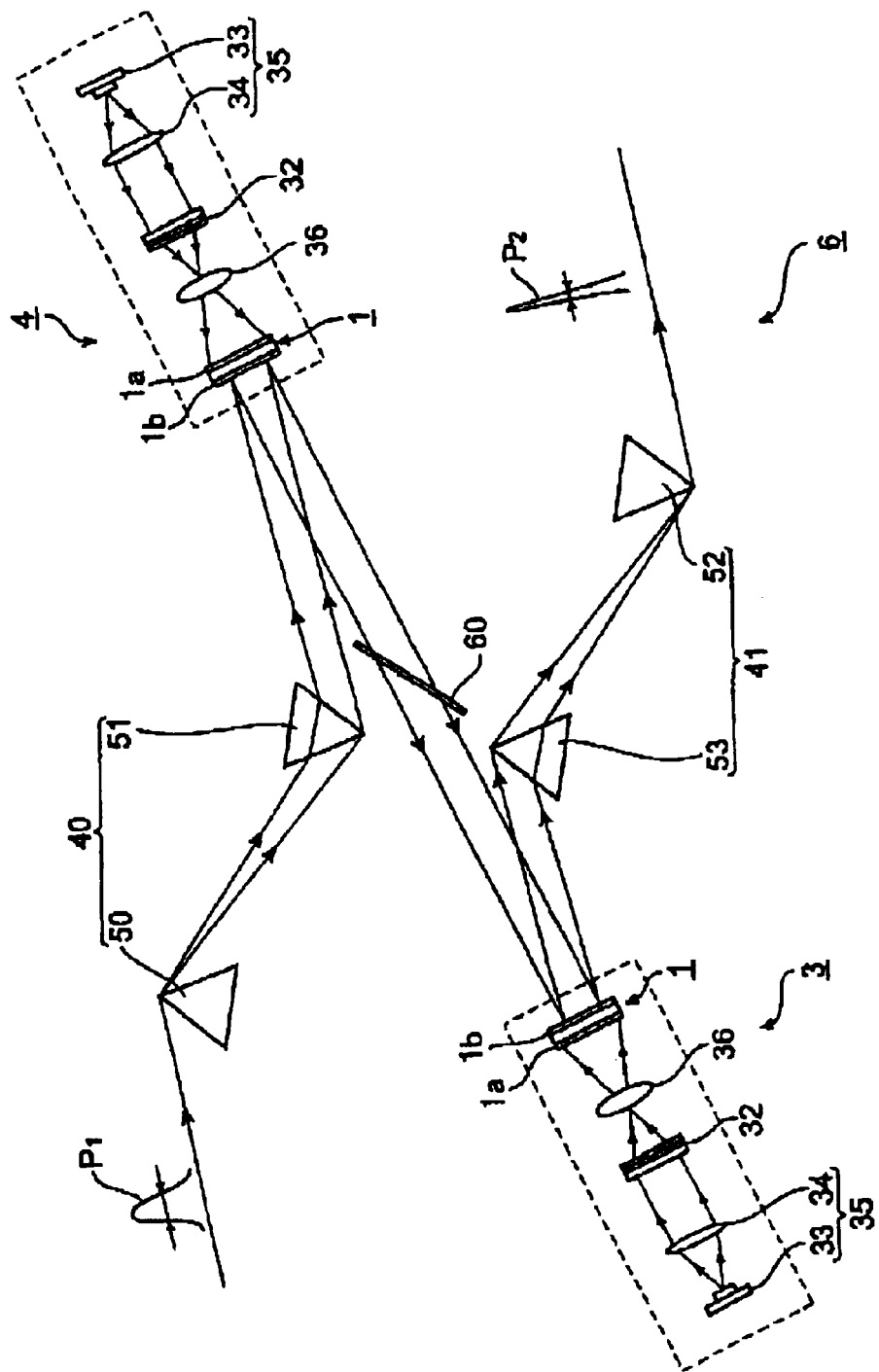
FIG. 11 shows the structure of another light pulse waveform controller that has the phase-modulation spatial light modulating device provided with the spatial light modulator according to the embodiment and that has an intensity-modulation spatial light modulating device provided with the spatial light modulator according to the embodiment.

As shown in FIG. 11, in the light pulse waveform controller 6, the phase-modulation spatial light modulating device 3 and an intensity-modulation spatial light modulating device 4 are optically connected with each other.

The light pulse waveform controller 6 will be described below.

In the light pulse waveform controller 6, the input optical system 40 includes a spectrum-forming prism 50 and a light-condensing prism 51 instead of the grating 30 and the collimator lens 38 of FIG. 10. In addition, the output optical system 41 includes a spectrum-forming prism 52 and a light-condensing prism 53 instead of the grating 31 and the collimator lens 39 of FIG. 10. The intensity-modulation spatial light modulating device 4, a polarizing plate 60 of a transmission type, and the phase-modulation spatial light modulating device 3 are arranged in this order between the input optical system 40 and the output optical system 41.

Each of the phase-modulation spatial light modulating device 3 and the intensity-modulation spatial light modulating device 4 has the same configuration as the light pulse shaping controller 2 of FIG. 10. In other words, each of the phase-modulation spatial light modulating device 3 and the intensity-modulation spatial light modulating device 4 includes: the spatial light modulator 1, which has the construction of FIG. 4 and which includes the chirp compensation dielectric multilayer film mirror 10 having the film thickness distribution according to either one of the first to third examples; the addressing light source 35; the transmission type liquid crystal element 32, and the imaging lens 36. The computer 37 (not shown) is connected to the transmission-type liquid crystal element 32.

Similarly to the light pulse shaping controller 2, the phase-modulation spatial light modulating device 3 is located in such an orientation that the orientation direction of the liquid crystal molecules within the liquid crystal layer 17 in the spatial light modulator 1 is aligned in parallel with the direction of the polarization of the incident light pulse $P_1$ that enters the liquid crystal layer 17 from the light-condensing prism 51. Thus, the spatial light modulator 1 modulates the phase of the incident light, in accordance with the address pattern entering to the address portion 1a, and emits a resultant light as a phase-modulated light.

On the other hand, the intensity-modulation spatial light modulating device 4 is located in such an orientation that the orientation direction of the liquid crystal molecules within the liquid crystal layer 17 in the spatial light modulator 1 is shifted by an angle of 45 degrees with respect to the direction of the polarization of the incident light pulse $P_1$ entering the liquid crystal layer 17 from the light-condensing prism 51. Thus, the spatial light modulator 1 rotates the plane of polarization of the incident light, in accordance with the address pattern entering to the address portion 1a, and emits a resultant light as a modulated light. The modulated light, whose plane of polarization has been rotated in such a manner, passes through the polarizing plate 60, and falls incident on the phase-modulation spatial light modulating device 3 as an intensity-modulated light having the intensity pattern corresponding to the address pattern. In this way, in the intensity-modulation spatial light modulating device 4, the spatial light modulator 1 is oriented in such a direction that the orientation of the liquid crystal molecules of the liquid crystal layer 17 is shifted by an angle of 45 degrees from the direction of the polarization of the incident light pulse $P_1$. Moreover, the polarizing plate 60 is installed on the light output side of the intensity-modulation spatial light modulating device 4. Thus, it is possible to attain the intensity modulation by controlling the inclination of the liquid crystal molecules at the respective positions in the liquid crystal layer 17 in accordance with the address pattern.

With the above-described configuration, the light pulse waveform controller 6 operates as described below.

When the incident pulse light $P_1$ falls incident on the light pulse waveform controller 6, the incident pulse light $P_1$ is separated by the prism 50 into its spectral components and gathered or condensed by the prism 51, and falls incident on the spatial light modulator 1 within the intensity-modulation spatial light modulating device 4. In the spatial light modulator 1, the plane of polarization at each wavelength component of the incident light is rotated by a corresponding desired amount at a corresponding location, in accordance with the inclination of the liquid crystal molecules occurred at the subject location that correspond to the address light in the subject location. The polarization-plane-rotated light selectively passes through the polarizing plate 60, thereby being converted into an intensity-modulated light. The thus intensity-modulated light falls incident on the spatial light modulator 1 within the phase-modulation spatial light modulating device 3, and is phase-modulated in the same manner as in the light pulse waveform controller 2 of FIG. 10. The light outputted from the phase-modulation spatial light modulating device 3 is condensed by the prism 53 and composed by the prism 52 into an ultrashort light pulse $P_2$.

In each of the spatial light modulators 1 within the phase-modulation spatial light modulating device 3 and the intensity-modulation spatial light modulating device 4, the chirp compensation dielectric multilayer film mirror 10 has the film thickness distribution of either one of the first to third examples. Accordingly, the phase-modulation spatial light modulating device 3 and the intensity-modulation spatial light modulating device 4 can attain the desired phase modulation and the desired intensity modulation with accuracy, respectively, without causing any additional undesired phase disturbance on the incident light pulse.

As described above, according to the light pulse waveform controller 6 of the present embodiment, the intensity-modulation spatial light modulating device 4 and the polarizing plate 60 are added to the phase-modulation spatial light modulating device 3 that is identical to the light pulse waveform controller 2 of FIG. 10. Accordingly, it is possible to control both of the phase and the intensity of the incident light pulse $P_1$ without applying any additional undesired phase disturbance onto the incident light pulse $P_1$. It is possible to control the waveform with very high degree of freedom. For example, it is possible to compress the pulse width with very high degree of freedom.

It is noted that a polarizing plate of a reflection type may be provided instead of the transmission type polarizing plate

60. The modulated light, whose plane of polarization of has been rotated by the intensity-modulation spatial light modulating device 4, reflects off the reflection type polarizing plate 60, and then falls incident on the phase-modulation spatial light modulating device 3 as the intensity-modulated light having the intensity pattern corresponding to the address pattern.

Figure 12A:
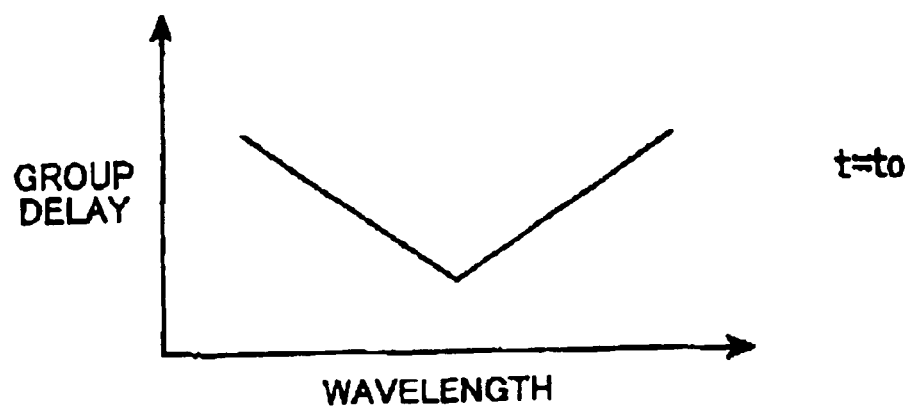
Figure 12B:
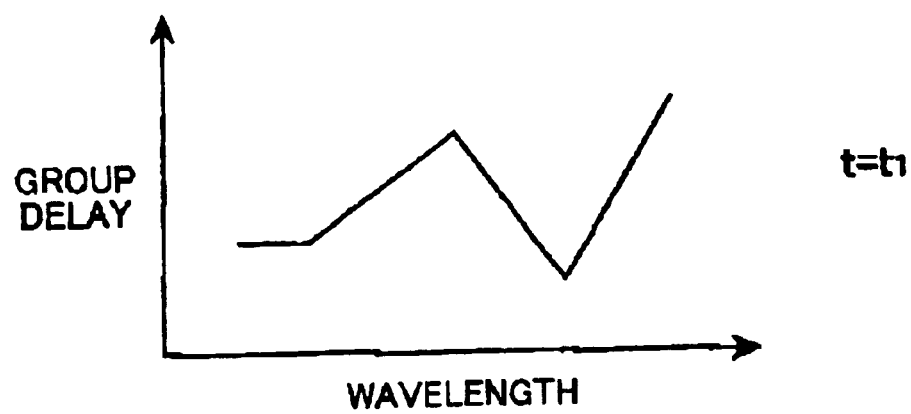
Figure 13A:
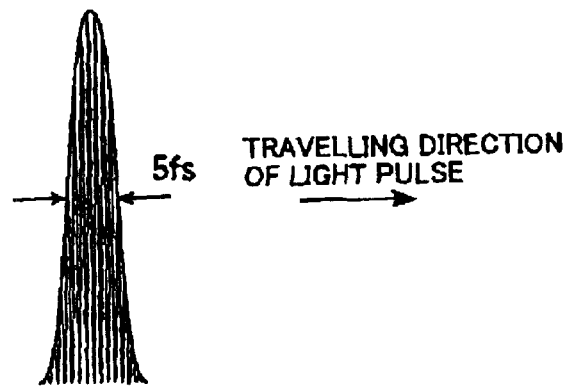
Figure 13B:
Figure 13C:
Figure 13D:
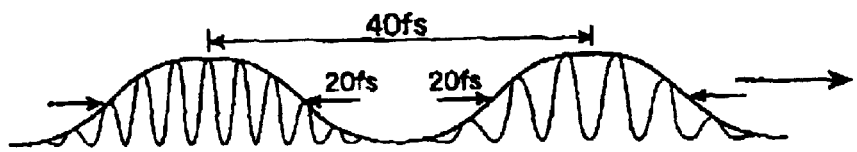
Figure 13E:
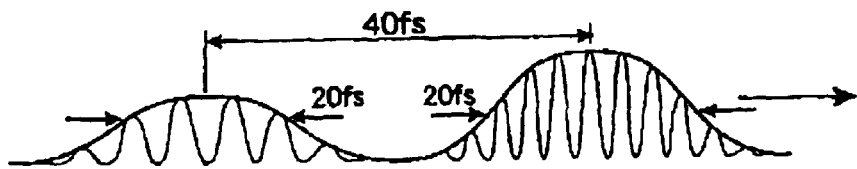

In addition, according to the spatial light modulator 1, by changing the address light pattern at a high speed, it is possible to change the voltage applied through the liquid crystal layer 17 at a high speed. For this reason, it is possible to arbitrarily and in real time change and control the phase- or intensity-modulation characteristics onto each wavelength component of the light. For example, it is possible to apply the read light with group delay characteristics (phase characteristics) as shown in FIG. 12($a$) at some time $t_0$, and then to change the group delay characteristics (phase characteristics) into other group delay characteristics (phase characteristics) as shown in FIG. 12($b$) at a next moment $t_1$.

According to the light pulse waveform controller 6 that employs the spatial light modulator 1, the incident pulse light $P_1$ can be shaped into the output pulse light $P_2$ of various shapes.

For example, the incident pulse light $P_1$ can be compressed into a pulse $P_2$ having a width of several femto-seconds as shown in FIG. 13($a$). Further, the incident pulse light $P_1$ can be shaped so that the wavelength is gradually shortened from the front edge side in the traveling direction as shown in FIG. 13($b$). Or, conversely, the incident pulse light $P_1$ can be shaped so that the wavelength is gradually lengthened from the front edge side in the traveling direction as shown in FIG. 13($c$). Furthermore, the incident pulse light $P_1$ can be shaped or separated into a shorter wavelength pulse and a longer wavelength pulse, with the longer wavelength pulse being located on the front side in the traveling direction relative to the shorter wavelength pulse as shown in FIG. 13($d$). Or, conversely, the shorter wavelength pulse may be located on the front side in the traveling direction relative to the longer wavelength pulse as shown in FIG. 13($e$). In this way, it becomes possible to change the wavelength components and the intensities thereof in the light pulse within several tens of femto-seconds. Consequently, it is possible to easily produce a desired pulse light that is used for being irradiated onto a substance in order to excite atoms or molecules at some femto-second level, for example.

The present invention is not limited to the above-described embodiment, but various modifications can be made.

For example, in the above-described embodiment, the liquid crystal layer is of a parallel aligned type. However, any other type of liquid crystal layer can be used. Any light modulation layers other than the liquid crystal layer may be used.

The above-described embodiment is of the optical address type spatial light modulator. However, the present invention can be applied to an electrical address type.

In the above-described embodiment, the light transmission portion is constituted by the orientation layers 16 and 18, the transparent electrode 19, the transparent substrate 20, and the antireflection coating 21. However, the light transmission portion may employ any other construction as long as the light transmission portion can transmit the incident light (read light) therethrough.

In the spatial light modulator of the above-described embodiment, the photoconductive layer 12 serving as a light address portion, the chirp compensation dielectric multilayer film mirror 10, and the liquid crystal layer 17 serving as an optical modulation portion are provided one on another in this order between the pair of transparent electrodes 19. However, the spatial light modulator of the present invention is not limited to this type of structure.

Figure 14A:
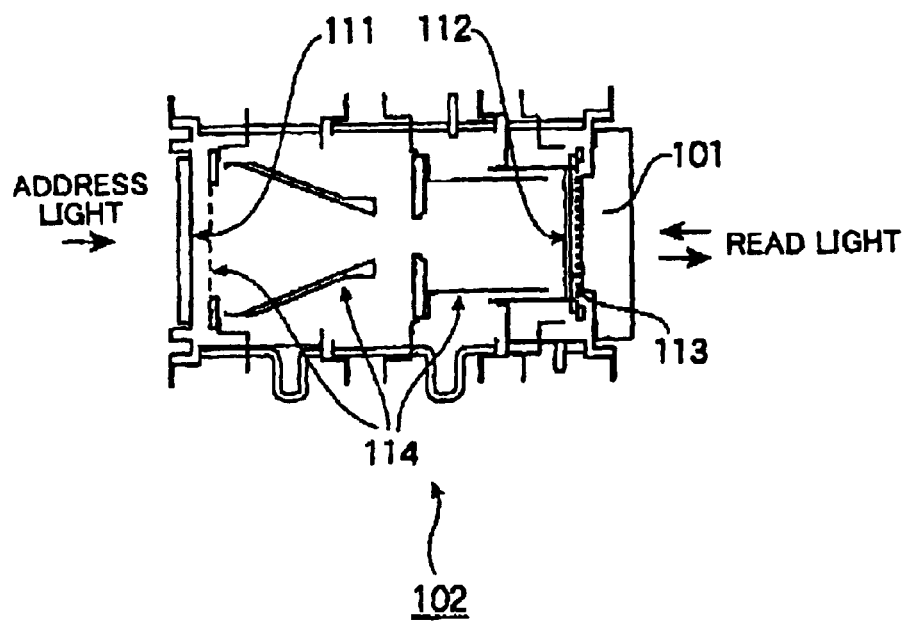
FIG. 14(a) shows a cross section of the whole part of a spatial light modulator of an LC-MSLM type according to a modification.
Figure 14B:
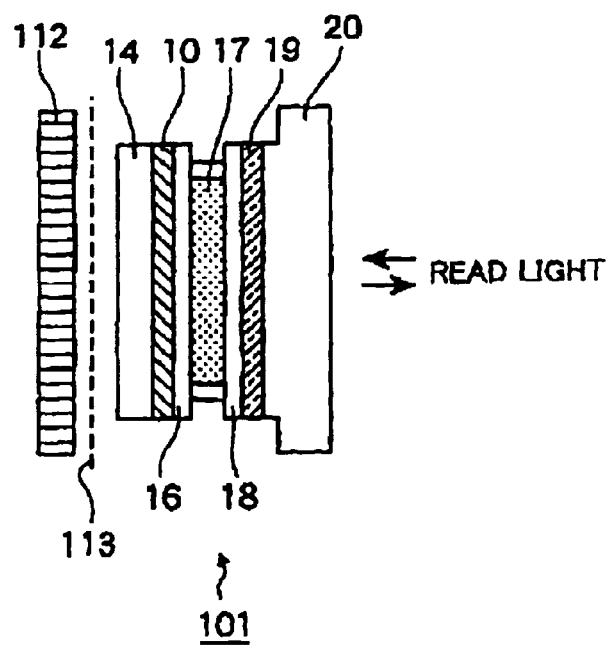
FIG. 14(b) is an enlarged cross sectional view of a liquid crystal portion in the spatial light modulator of the LC-MSLM type according to the modification.

For example, the spatial light modulator of the present invention may be applied to a spatial light modulator 102 of an LC-MSLM (Liquid Crystal-Microchannel Spatial Light Modulator) type shown in FIG. 14($a$). The spatial light modulator 102 of an LC-MSLM type includes no photoconductive layer. In the spatial light modulator 102 of the LC-MSLM type, the address light is irradiated on no photoconductive layer in order to change the modulation characteristics of the liquid crystal layer, but the address light is converted into photoelectrons, which are then used to write address information to the liquid crystal layer.

More specifically, as shown in FIG. 14($a$), this spatial light modulator 102 includes a photocathode 111, acceleration/convergence electrodes 114, a microchannel plate (hereinafter, referred to as an MCP) 112, a mesh electrode 113, and a liquid crystal portion 101. As shown in FIG. 14($b$), the liquid crystal portion 101 is constructed by providing the transparent substrate 14, the chirp compensation dielectric multilayer film mirror 10, the orientation layer 16, the liquid crystal layer 17, the orientation layer 18, the transparent electrode 19, and the transparent substrate 20 in this order from the side of the mesh electrode 113. A predetermined voltage is applied between the mesh electrode 113 and the transparent electrode 19, and almost all the part of the predetermined voltage is normally applied across the vacuum region defined between the mesh electrode 113 and the transparent substrate 14.

With such a structure, when the address light falls incident on the photocathode 111, the address light is converted into electrons. These electrons are accelerated and converged by the acceleration/convergence electrodes 114, multiplied by the MCP 112, and fall incident on the transparent substrate 14 of the liquid crystal portion 101. As a result, the electrons are accumulated in the transparent substrate 14, and the transparent substrate 14 is charged negatively. Or, the transparent substrate 14 may be charged positively by emitting secondary electrons therefrom. In this way, a voltage is applied through the region including the liquid crystal layer 17. Thus, the voltage corresponding to the pattern of the address light is applied to the liquid crystal molecules in the liquid crystal layer 17, and the liquid crystal molecules are inclined. The read light falls incident on the liquid crystal layer 17 through the transparent substrate 20. When the read light is propagated through the liquid crystal layer 17, the read light undergoes modulation corresponding to the inclination of the liquid crystal molecules, and reflects off the chirp compensation dielectric multilayer film mirror 10. Then, the read light is propagated through the liquid crystal layer 17 again, modulated by the liquid crystal layer 17, and outputs through the transparent substrate 20.

In this spatial light modulator 102, the chirp compensation dielectric multilayer film mirror 10 has the uniform group delay characteristics not to apply additional undesired disturbance onto the phase of the read light, or cancels out the group delay caused by the light transmission portion (i.e., the orientation layers 16 and 18, the transparent electrode 19, and the transparent substrate 20) to thereby eliminate the additional undesired disturbance of phase. The basic structure of the spatial light modulator 102 is described by N. Mukohzaka et al. in "Japanese Journal of Applied Physics", Vol. 29, No. 7, July 1990, pp. 1227 to 1230, for example.

As the spatial light modulator 102 of the LC-MSLM type, it is possible to employ any other kinds of spatial light modulators as long as they include an optical modulation portion, an address portion, and the chirp compensation dielectric multilayer-film mirror 10 reflecting the incident light. Representative examples of the spatial light modulators include: an MSLM in which the optical modulation portion has an electrooptic crystal such as $LINbO_2$ crystal; an MSLM of an electron beam write type in which the photocathode is removed from the MSLM to receive electron beams directly from the outside; an electrical address type such as a CCD-LCLV including a CCD as the address portion; and a PROM using a material such as BSO that serves as both of the optical modulation portion and the address portion. As for the optical modulation portion, an organic material or the like may be used instead of liquid crystal or electrooptic crystal.

In the light pulse waveform controllers of FIG. 10 and FIG. 11, the transmission-type liquid crystal element 32 is used to write address information in the spatial light modulator 1. However, the present invention is not limited to this embodiment. For example, a CRT or the like may be used to write address information to the spatial light modulator of the present invention if the spatial light modulator of the present invention includes the spatial light modulator 1 of the above-described embodiment or any other optical address type spatial light modulator, such as the LC-MLSM 102, MLSM, or a PROM described above. An electron beam or an electrical signal may be used to write address information to the spatial light modulator of the present invention if the spatial light modulator of the present invention includes the spatial light modulator of an electrical address type, such as an electron beam MSLM or a CCD-LCLV.

In the above-described embodiment, the dielectric multilayer-film mirror is formed by providing layers of titanium oxide ($TiO_2$) and silicon dioxide ($SiO_2$) in alternation. However, the dielectric multilayer-film mirror may be configured by providing layers of a plurality of any kinds of dielectric films alternately. For example, the dielectric multilayer film mirror may be structured by alternately providing layers of three or more different kinds of dielectric films in order. The optical film thickness of each dielectric film that depends on the refractive index and the film thickness of the subject dielectric film may be set to such a value that can provide the desired reflectivity characteristics and the desired group delay characteristics.

In the light pulse waveform controller 6 of FIG. 11, the phase-modulation spatial light modulating device 3 is located in the subsequent stage of the intensity-modulation spatial light modulating device 4. However, the intensity-modulation spatial light modulating device 4 may be located in the subsequent stage of the phase-modulation spatial light modulating device 3.

Industrial Applicability

The spatial light modulator according to the present invention can be widely used in various applications including the chemical field and the communication field.

In the chemical field, the spatial light modulator according to the present invention can be used to shape an ultrashort light pulse into a desired waveform and to irradiate a desired substance with the ultrashort light pulse having the desired shape, in order to observe, like a slow motion picture, the moment when the chemical reaction takes place in the desired substance.

In the communication field, the large capacity optical communication is executed using a light pulse such as an ultrashort light pulse. The spatial light modulator according to the present invention can be used to execute chirp compensation onto the light pulse in order to prevent the pulse widths in individual wavelengths from spreading to cause interference with one another while the light pulse is being propagated by a wavelength division multiplex technology through a transmission path such as an optical fiber.

What is claimed is:

1. A spatial light modulator, comprising:
   an address portion receiving address information;
   an optical modulation portion modulating incident light by using its modulation characteristics that are changed according to the address information, the incident light having a predetermined wavelength range;
   a light transmission portion transmitting the incident light; and
   a dielectric multilayer-film mirror reflecting the incident light modulated by the optical modulation portion, the dielectric multilayer-film mirror having predetermined reflectivity characteristics within the predetermined wavelength range, the dielectric multilayer-film mirror having group delay characteristics that prevent both the dielectric multilayer-film mirror and the light transmission portion from applying a total phase disturbance to the incident light within the predetermined wavelength range.

2. A spatial light modulator as claimed in claim 1, wherein the dielectric multilayer-film mirror includes a plurality of different kinds of dielectric films which are provided one on another in alternation, an optical thickness of each dielectric film, which is determined dependent on refractive index of and a thickness of the subject dielectric film, having a value that corresponds to the predetermined reflectivity characteristics and to the group delay characteristics.

3. A spatial light modulator as claimed in claim 2,
   wherein the light transmission portion applies the incident light with no group delay when transmitting the incident light therethrough, and
   wherein the dielectric multilayer-film mirror has the group delay characteristics for applying the incident light with a group delay, whose amount is substantially fixed over the predetermined wavelength range, when the dielectric multilayer-film minor reflects the incident light.

4. A spatial light modulator as claimed in claim 2, wherein the light transmission portion applies the incident light with a predetermined group delay when transmitting the incident light therethrough, and
   wherein the dielectric multilayer-film mirror has the predetermined reflectivity characteristics within the predetermined wavelength range, and has the group delay characteristics that compensate for the predetermined group delay within the predetermined wavelength range.

5. A spatial light modulator as claimed in claim 4, wherein the light transmission portion includes a transparent substrate transmitting the incident light therethrough, the transparent substrate applying the predetermined group delay to the incident light when the incident light passes through the transparent substrate, the dielectric multilayer-film mirror having the group delay characteristics that compensate for the predetermined group delay within the wavelength range.

6. A spatial light modulator as claimed in claim 2,
   wherein the address portion includes a photoconductive layer,
   wherein the optical modulation portion includes a liquid crystal layer, and wherein the photoconductive layer, the dielectric multilayer-film mirror, and the liquid crystal layer are provided one on another in this order between a pair of transparent electrodes.

7. A spatial light modulator as claimed in claim 1, further comprising:
   a first spectral-component separation unit separating an incident light pulse having the predetermined wavelength range into spectral components, thereby producing the incident light;
   a first condensing unit gathering the incident light, which is obtained by the first spectral-component separation unit, and irradiating the gathered incident light onto the optical modulation portion;
   a first address information writing unit outputting the address information indicative of phase modulation desired to be subjected onto the incident light;
   a second condensing unit gathering an output light which has been modulated in phase by the optical modulation portion and which has been outputted from the optical modulation portion; and
   a second spectral-component separation unit receiving the output light gathered by the second condensing unit, combining together the received output light, and outputting a resultant light as an output light pulse.

8. A spatial light modulator as claimed in claim 7, wherein the first address information writing unit includes:
   an addressing light source producing first write light having a uniform intensity,
   a first liquid crystal element addressed by an electrical signal indicative of the address information and modulating the first write light to produce first address light; and
   a first imaging unit imaging the first address light on the address portion.

9. A spatial light modulator as claimed in claim 7, further comprising an intensity-modulation spatial light modulating device modulating the incident light in intensity,
   wherein the first condensing unit gathers the incident light and irradiates the gathered incident light onto the intensity-modulation spatial light modulating device, the incident light which has been intensity-modulated by the intensity-modulation spatial light modulating device falling incident on the optical modulation portion,
   wherein the intensity-modulation spatial light modulating device includes:
   a second address information writing unit outputting another address information indicative of intensity modulation desired to be subjected to the incident light; and
   a reflective intensity-modulation spatial light modulator subjecting the incident light to intensity modulation that is indicated by the other address information, and
   wherein the reflective intensity-modulation spatial light modulator includes:
   another address portion receiving the second address information;
   another optical modulation portion modulating incident light from the first condensing unit by using its modulation characteristics that are changed according to the other address information;
   another light transmission portion transmitting the incident light; and
   another dielectric multilayer-film mirror reflecting the incident light modulated by the optical modulation portion, the other dielectric multilayer-film mirror having other predetermined reflectivity characteristics within the predetermined wavelength range, the other dielectric multilayer-film mirror preventing having group delay characteristics that prevent both the other dielectric multilayer-film mirror and the other light transmission portion from applying a total phase disturbance to the incident light within the predetermined wavelength range.

10. A spatial light modulator as claimed in claim 9, wherein the other optical modulation portion in the reflective intensity-modulation spatial light modulator includes:
    a polarization state modulating portion modulating a polarization state of the incident light by using its modulation characteristics that are changed according to the other address information; and
    a polarizing unit converting, into intensity-modulated light, the incident light whose polarization state has been modulated by the polarization state modulating portion and which has been outputted from the polarization state modulating portion, the intensity-modulated light falling incident on the optical modulation portion as the incident light.

11. A spatial light modulator as claimed in claim 9, wherein the second address information writing unit includes:
    a second addressing light source producing second write light having a uniform intensity;
    a second liquid crystal element addressed by an electrical signal indicative of the other address information and modulating the second write light to produce second address light; and
    a second imaging unit imaging the second address light on the other address portion of the reflective intensity-modulation spatial light modulator.

12. A spatial light modulator as claimed in claim 9, wherein the other dielectric multilayer-film mirror has the group delay characteristics that are determined dependent on a phase disturbance, which the other light transmission portion applies to the incident light when transmitting the incident light therethrough, to allow the other dielectric multilayer-film mirror and the other light transmission portion to apply no total phase disturbance to the incident light within the predetermined wavelength range.

13. A spatial light modulator as claimed in claim 1, wherein the dielectric multilayer-film mirror has the group delay characteristics that are determined dependent on a phase disturbance, which the light transmission portion applies to the incident light when transmitting the incident light therethrough, to allow the dielectric multilayer-film mirror and the light transmission portion to apply no total phase disturbance to the incident light within the predetermined wavelength range.

14. A light pulse waveform controller, comprising:
    a first spectral-component separation unit separating an incident light pulse having a predetermined wavelength range into spectral components, thereby producing an incident light;
    a first condensing unit gathering the incident light which is obtained by the first spectral-component separation unit;
    a first address information writing unit outputting first address information indicative of phase modulation desired to be subjected onto the incident light;

a reflective phase-modulation spatial light modulator subjecting the incident light to a phase modulation indicated by the first address information, the phase-modulation spatial light modulator including:
  a first address portion receiving the first address information;
  a first optical modulation portion modulating incident light by using its modulation characteristics that are changed according to the first address information;
  a first light transmission portion transmitting the incident light; and
  a first dielectric multilayer-film mirror reflecting the incident light modulated by the first optical modulation portion, the first dielectric multilayer-film mirror having first predetermined reflectivity characteristics within the predetermined wavelength range, the first dielectric multilayer-film mirror having first group delay characteristics that prevent both the first dielectric multilayer-film mirror and the first light transmission portion from applying a total phase disturbance to the incident light within the predetermined wavelength range;
  a second condensing unit gathering an output light which has been outputted from the reflective phase-modulation spatial light modulator; and
  a second spectral-component separation unit receiving the output light gathered by the second condensing unit, combining together the received output light, and outputting a resultant light as an output light pulse.

15. A light pulse waveform controller as claimed in claim 14, wherein the first dielectric multilayer-film mirror includes a plurality of different kinds of dielectric films which are provided one on another in alternation, an optical thickness of each dielectric film, which is determined dependent on refractive index of and a thickness of the subject dielectric film, having a value that corresponds to the predetermined reflectivity characteristics and to the first group delay characteristics.

16. A light pulse waveform controller as claimed in claim 15,
  wherein the light transmission portion applies the incident light with no group delay when transmitting the incident light therethrough, and
  wherein the first dielectric multilayer-film mirror has the group delay characteristics for applying the incident light with a group delay, whose amount is substantially fixed over the predetermined wavelength range, when the dielectric multilayer-film mirror reflects the incident light.

17. A light pulse waveform controller as claimed in claim 15, wherein the first light transmission portion applies the incident light with a first predetermined group delay when transmitting the incident light therethrough, and
  wherein the first dielectric multilayer-film mirror has the predetermined first reflectivity characteristics within the predetermined wavelength range, and has the group delay characteristics that compensate for the first predetermined group delay within the predetermined wavelength range.

18. A light pulse waveform controller as claimed in claim 17, wherein the first light transmission portion includes a first transparent substrate transmitting the incident light therethrough, the first transparent substrate applying the first predetermined group delay to the incident light when the incident light passes through the first transparent substrate, the first dielectric multilayer-film mirror having the group delay characteristics that compensate for the first predetermined group delay within the wavelength range.

19. A light pulse waveform controller as claimed in claim 14, wherein the first address information writing unit includes:
  a first addressing light source producing first write light having a uniform intensity;
  a first transmissive liquid crystal element addressed by an electrical signal indicative of the first address information and modulating the first write light to produce first address light; and
  a first imaging unit imaging the first address light on the address portion of the reflective phase-modulation spatial light modulator.

20. A light pulse waveform controller as claimed in claim 14, further comprising:
  a second address information writing unit outputting second address information indicative of intensity modulation desired to be subjected to the incident light; and
  a reflective intensity-modulation spatial light modulator subjecting the incident light to intensity modulation that is indicated by the second address information, and
  wherein the reflective intensity-modulation spatial light modulator includes:
    a second address portion receiving the second address information;
    a second optical modulation portion modulating incident light from the first condensing unit by using its modulation characteristics that are changed according to the second address information;
    a second light transmission portion transmitting the incident light; and
    a second dielectric multilayer-film mirror reflecting the incident light modulated by the optical modulation portion, the second dielectric multilayer-film mirror having second predetermined reflectivity characteristics within the predetermined wavelength range, the dielectric multilayer-film mirror having second group delay characteristics that prevent both the second dielectric multilayer film mirror and the second light transmission portion from applying a total phase disturbance to the incident light within the predetermined wavelength range, and
  wherein the first optical modulation portion in the reflective phase-modulation spatial light modulator receives the incident light that has been modulated in intensity by the reflective intensity-modulation spatial light modulator.

21. A light pulse waveform controller as claimed in claim 20, wherein the second optical modulation portion in the reflective intensity-modulation spatial light modulator includes:
  a polarization state modulating portion modulating a polarization state of the incident light gathered by the first condensing unit by using its modulation characteristics that are changed according to the second address information; and
  a polarizing unit converting, into intensity-modulated light, the incident light whose polarization state has been modulated by the polarization state modulating portion and which has been outputted from the polarization state modulating portion.

22. A light pulse waveform controller as claimed in claim 20, wherein the second address information writing unit includes:

a second addressing light source producing second write light having a uniform intensity;

a transmissive second liquid crystal element addressed by an electrical signal indicative of the second address information and modulating the second write light to produce second address light; and a second imaging unit imaging the second address light on the second address portion of the reflective intensity-modulation spatial light modulator.

23. A light pulse waveform controller as claimed in claim 20, wherein the dielectric multilayer-film mirror has the second group delay characteristics that are determined dependent on a phase disturbance, which the second light transmission portion applies to the incident light when transmitting the incident light therethrough, to allow the second dielectric multilayer-film mirror and the second light transmission portion to apply total phase disturbance to the incident light within the predetermined wavelength range.

24. A light pulse waveform controller as claimed in claim 14, wherein the first dielectric multilayer-film mirror has the first group delay characteristics that are determined dependent on a phase disturbance, which the first light transmission portion applies to the incident light when transmitting the incident light therethrough, to allow the first dielectric multilayer-film mirror and the first light transmission portion to apply no total phase disturbance to the incident light within the predetermined wavelength range.

* * * * *